(12) United States Patent
Hara et al.

(10) Patent No.: US 7,248,037 B2
(45) Date of Patent: Jul. 24, 2007

(54) POSITION SENSING DEVICE FOR DETERMINING A RELATIVE POSITION OF A MAGNET WITH RESPECT TO A MAGNETIC FIELD SENSING ELEMENT PAIR

(75) Inventors: Yoshihiro Hara, Kishiwada (JP); Akira Kosaka, Yao (JP); Satoshi Masuda, Kyoto (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 92 days.

(21) Appl. No.: 10/988,788

(22) Filed: Nov. 15, 2004

(65) Prior Publication Data

US 2005/0258822 A1 Nov. 24, 2005

(30) Foreign Application Priority Data

May 20, 2004 (JP) ............................. 2004-150707

(51) Int. Cl.
*G01B 7/14* (2006.01)
(52) U.S. Cl. .............................. 324/207.24; 324/207.2; 324/207.21
(58) Field of Classification Search ........... 324/207.12, 324/207.2–207.25, 207.26; 338/32 R, 32 H; 348/208.99
See application file for complete search history.

(56) References Cited

U.S. PATENT DOCUMENTS

| 4,471,304 | A | * | 9/1984 | Wolf ..................... 324/207.24 |
| 5,003,363 | A | * | 3/1991 | Lachmann ................ 338/32 H |
| 5,045,920 | A | * | 9/1991 | Vig et al. .................... 257/414 |
| 5,142,225 | A | * | 8/1992 | Gerlach et al. ......... 324/207.21 |
| 5,570,015 | A | * | 10/1996 | Takaishi et al. ........ 324/207.21 |
| 5,719,496 | A | * | 2/1998 | Wolf ........................... 324/165 |
| 5,955,881 | A | * | 9/1999 | White et al. ............. 324/207.2 |
| 6,051,971 | A | * | 4/2000 | Holden .................. 324/207.24 |
| 6,323,642 | B1 | * | 11/2001 | Nishimura et al. ...... 324/207.2 |
| 6,593,734 | B1 | * | 7/2003 | Gandel et al. ......... 324/207.25 |
| 6,919,719 | B2 | * | 7/2005 | Reininger ................ 324/207.2 |

FOREIGN PATENT DOCUMENTS

DE 3803293 * 8/1989
JP 2003-318459 11/2003

\* cited by examiner

*Primary Examiner*—Jay M. Patidar
(74) *Attorney, Agent, or Firm*—Brinks Hofer Gilson & Lione

(57) ABSTRACT

A position detector includes a pair of magnetic sensors spaced from each other and a magnetic force generator movable relative to the pair of magnetic sensors. The length of the magnetic force generator along the space between the magnetic sensors is equal to or larger than a length of a space between the magnetic sensors. Preferably, the length of the magnetic force generator along the space between the magnetic sensors is equal to or larger than a sum of the length of the space between the magnetic sensors and an allowable moving distance of the magnetic force generator.

9 Claims, 17 Drawing Sheets

F I G . 5
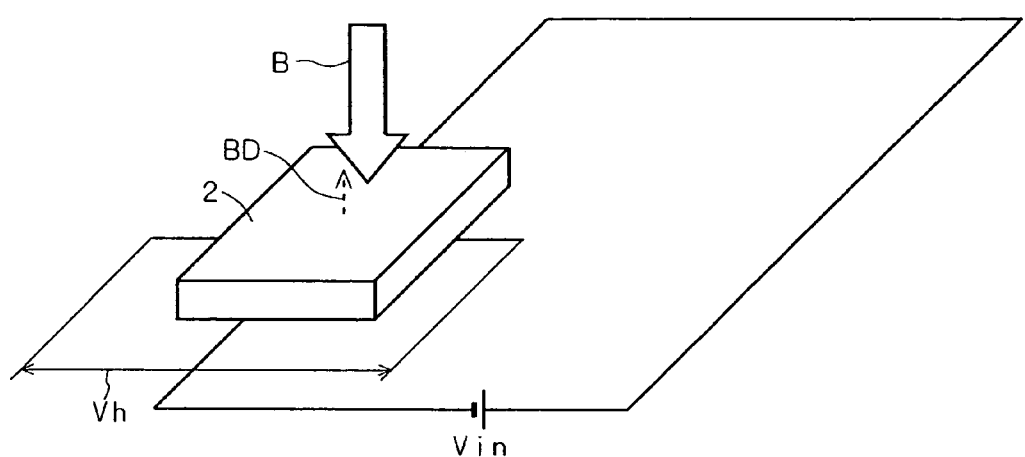
F I G . 6
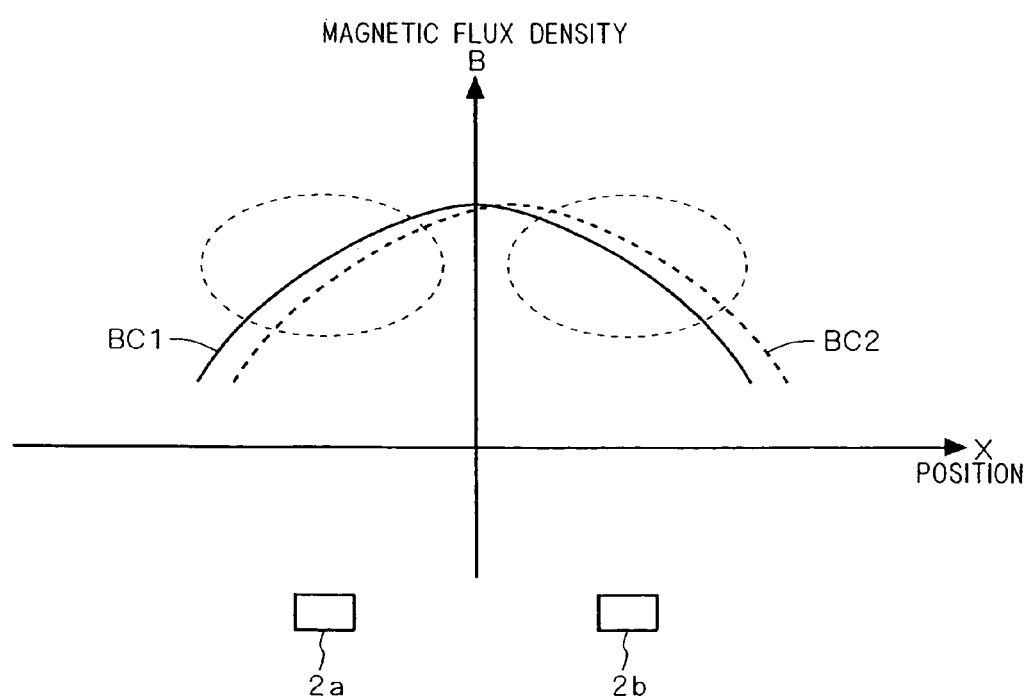

ized position detection, as an example. The position detec-
POSITION SENSING DEVICE FOR DETERMINING A RELATIVE POSITION OF A MAGNET WITH RESPECT TO A MAGNETIC FIELD SENSING ELEMENT PAIR This application is based on application No. 2004-150707 filed in Japan, the contents of which are hereby incorporated by reference.

BACKGROUND OF THE INVENTION

1. Field of the Invention

The present invention relates to a position detector for detecting relative positions of two objects, and a camera-shake compensation mechanism and an image capture apparatus each of which utilizes the position detector.

2. Description of the Background Art

Among various types of position detectors for detecting relative positions of two objects (a linear encoder, for example), a position detector of a type that utilizes a Hall effect device (magnetic sensor) has been developed. One example of such position detector is a position detection sensor taught by Japanese Patent Application Laid-Open No. 2003-318459 (which will be hereinafter referred to as "JP 2003-318459"), which is used as a pointing device or the like. The position detection sensor taught by JP 2003-318459 includes a ferrite magnet and a pair of Hall effect devices, and detects a position of the ferrite magnet based on an output difference between the pair of Hall effect devices.

The position detection sensor taught by JP 2003-318459, however, is susceptible to influences of an external magnetic field, and thus detection accuracy thereof is not always sufficiently high.

SUMMARY OF THE INVENTION

It is therefore an object of the present invention to provide a position detector capable of producing highly accurate detection results, and techniques associated therewith.

To attain the foregoing object, according to a first aspect of the present invention, a position detector includes: a magnetic-sensor pair including magnetic sensors spaced from each other; a magnetic force generator; and a controller for detecting relative positions of the magnetic force generator and the magnetic-sensor pair based on respective output values of the magnetic sensors. A length of the magnetic force generator along a first axis along which a first space between the magnetic sensors extends is equal to or larger than a length of the first space along the first axis.

With the position detector according to the first aspect of the present invention, it is possible to suppress influences of an external magnetic field, to achieve high accurate measurement.

Further, the present invention is directed also to a camera-shake compensation mechanism and an image capture apparatus each of which includes the foregoing position detector. With the camera-shake compensation mechanism and the image capture apparatus, it is possible to suppress influences of an external magnetic field, to achieve high accurate measurement, while meeting demands for size and cost reduction.

These and other objects, features, aspects and advantages of the present invention will become more apparent from the following detailed description of the present invention when taken in conjunction with the accompanying drawings.

DESCRIPTION OF THE DRAWINGS

FIG. 5 shows a principle of position detection performed by a Hall effect device (magnetic sensor).

FIG. 6 shows a distribution of magnetic flux density of a magnetic force generator.

DESCRIPTION OF THE PREFERRED EMBODIMENTS

Below, preferred embodiments of the present invention will be described with reference to accompanying drawings.

A. First Preferred Embodiment

Overview of Structure

In a first preferred embodiment, description will be given by taking a position detector 10A for achieving one-dimensional position detection, as an example. The position detector 10A is a linear encoder of a magnetic type.

Figure 1:
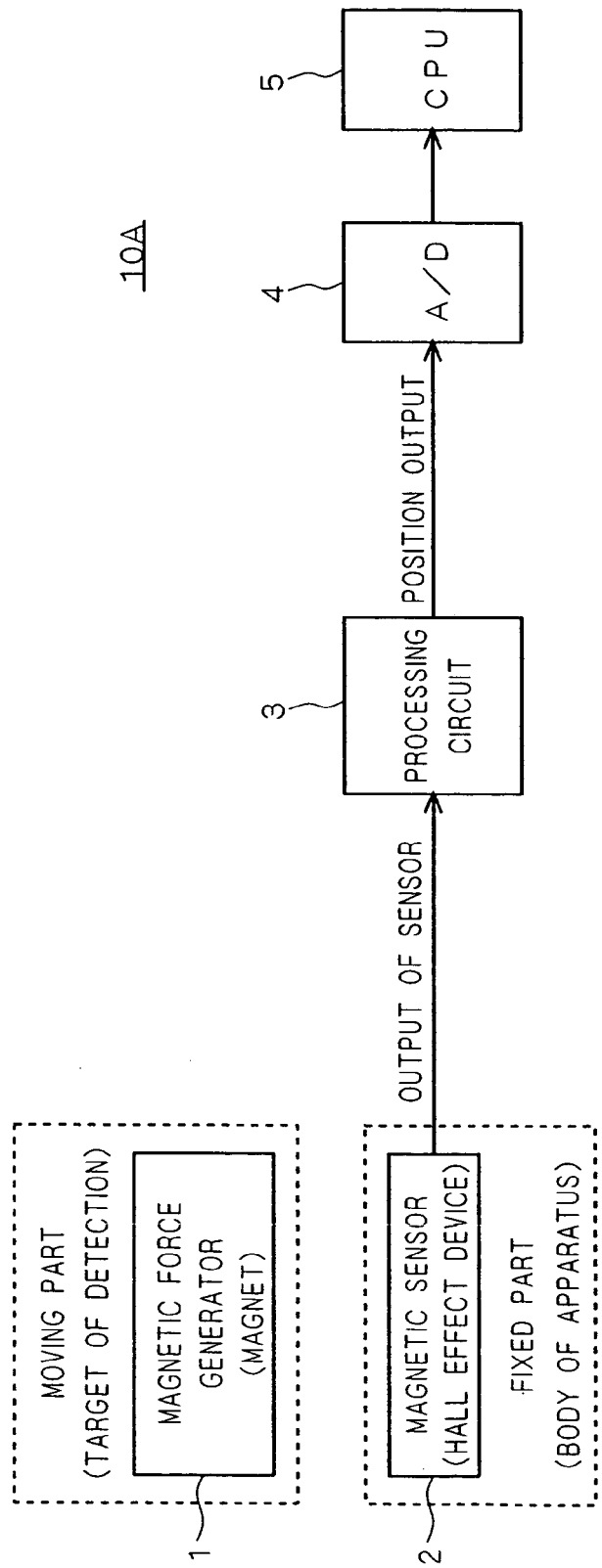
FIG. 1 is a schematic view of a structure of a position detector according to a first preferred embodiment.
Figure 2:
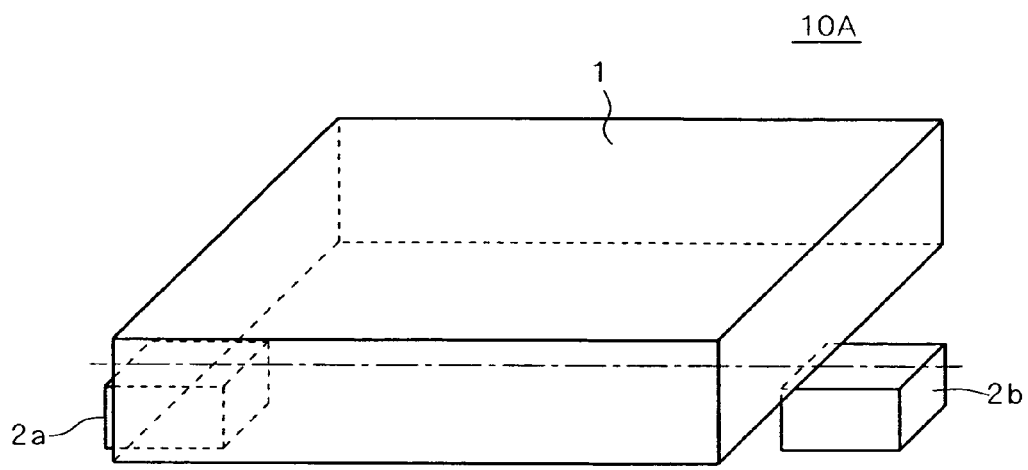
FIG. 2 is a perspective view illustrating physical configuration of parts forming the position detector.
Figure 3:
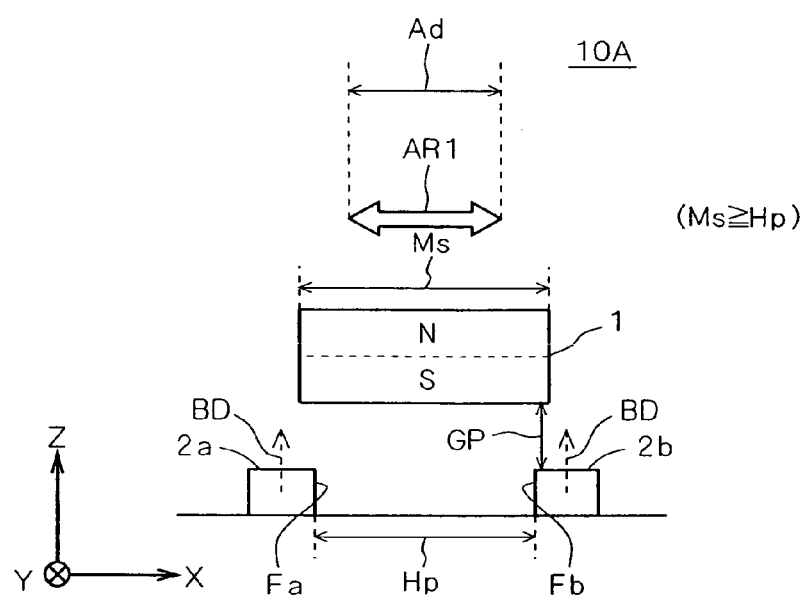
FIG. 3 is a sectional view illustrating the physical configuration of parts forming the position detector.
Figure 4:
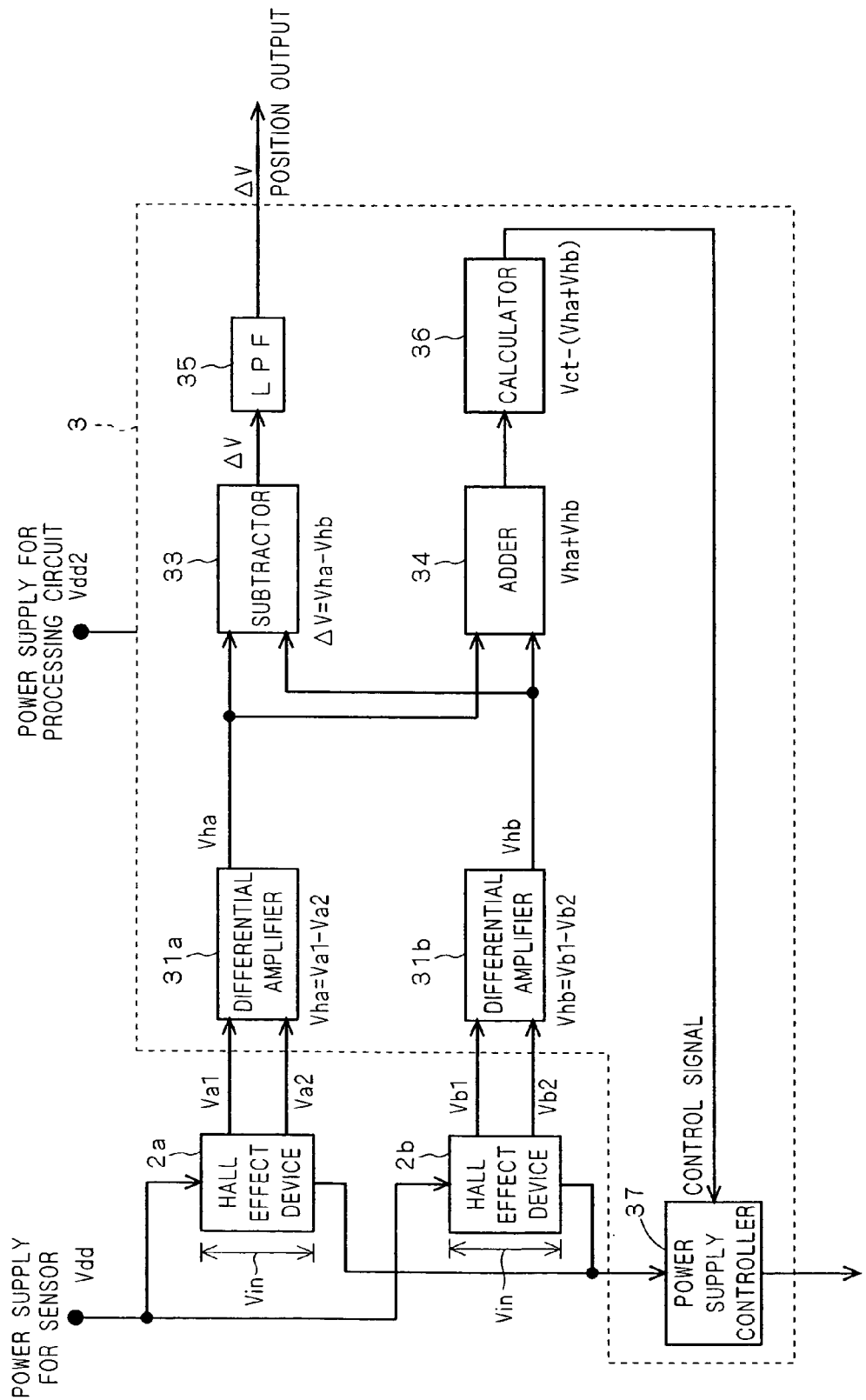
FIG. 4 illustrates an electrical processing circuit of the position detector.

FIG. 1 schematically illustrates the position detector 10A. FIGS. 2 and 3 are a perspective view and a sectional view, respectively, both of which illustrate physical configuration of parts forming the position detector 10A. FIG. 4 illustrates an electrical processing circuit of the position detector 10A. It is additionally noted that though FIG. 1 illustrates a Hall effect device 2 as one unit for purposes of simplification, actually, a plurality of Hall effect devices are provided as later described in detail.

As illustrated in FIGS. 2 and 3, the position detector 10A includes one magnet (magnetic force generator) 1 and two Hall effect devices (in other words, one pair of Hall effect devices or one magnetic-sensor pair) 2a and 2b which are spaced from each other. In the present example, a magnet (more precisely, a permanent magnet) is employed as a magnetic force generator, and a Hall effect device is employed as a magnetic sensor. However, the present invention is not limited to such example, and an electromagnet or the like can alternatively be employed as a magnetic force generator, for example. Also, an MR device or the like can alternatively be employed as a magnetic sensor.

The magnet 1 is prismatic, and an upper face and a bottom face thereof are magnetized to serve as a north pole and a south pole, respectively. It is additionally noted that the shape of the magnet is not limited to a prism. The magnet 1 may alternatively be cylindrical, for example. However, a prismatic magnet is advantageous over a cylindrical magnet in the following respects. First, manufacture of the magnet is facilitated. Secondly, alignment of the magnet during mounting of the magnet 1 becomes easy because of the presence of corners, to facilitate the mounting.

The pair of Hall effect device 2a and 2b are attached to a part in a fixed section (a fixed part) such as a body of an apparatus for which position detection is supposed to be performed. The magnet 1 is attached to a part in a moving section (a moving part) which moves relative to the fixed part. Then, the magnet 1 attached to the moving part is movable relative to the pair of Hall effect devices 2a and 2b attached to the fixed part, as indicated by a two-headed arrow AR1 in FIG. 3 (along an X axis). More specifically, the magnet 1 is movable along the X axis along which the Hall effect devices 2a and 2b are arranged (i.e., along a space between the Hall effect devices 2a and 2b) in a plane parallel to a plane in which the Hall effect devices 2a and 2b are arranged. In the position detector 10A, a position of the magnet 1 relative to the pair of Hall effect devices 2a and 2b is detected. In this regard, since the magnet (permanent magnet) 1 which requires no electric wiring is attached to the moving part, installation of wiring in at least a portion of the moving part to which the magnet 1 is attached becomes unnecessary, to thereby increase flexibility in designing wiring.

The position detector 10A further includes a processing circuit 3, an A/D conversion circuit 4, and a CPU 5, as illustrated in FIG. 1. Outputs of the two Hall effect devices 2a and 2b are processed by the processing circuit 3, so that relative positions of the magnet 1 and the pair of Hall effect devices 2a and 2b on a predetermined axis (one-dimensional relative positions on the X axis in the present example) can be detected. In the present example, an analog signal indicative of a position output (an output representing a position of the magnet 1) is outputted from the processing circuit 3, and subsequently converted into a digital signal by the A/D conversion circuit 4. Then, the digital signal is inputted to the CPU 5, where the digital signal is subjected to various processing. Details about processing carried out by the processing circuit 3 will be later described. It is noted that though the position detector 10A includes a circuit or the like for digitization (the A/D conversion circuit 4 and the CPU 5) in addition to the processing circuit 3 in the present example, the present invention is not limited to this example. The position detector 10A is not necessarily required to include the A/D conversion circuit 4 or the CPU 5, for example.

Principle of Position Detection

FIG. 5 shows a principle of position detection performed by the Hall effect device (magnetic sensor). Referring to FIG. 5, each of the Hall effect devices 2 is a magnetoelectric transducer which utilizes Hall effect and operates as follows. First, a predetermined input voltage Vin is applied to the Hall effect device 2 to cause a current (charged particles) to flow through the Hall effect device 2. Subsequently, a magnetic field in a direction perpendicular to a direction of the current flow is applied to the Hall effect device, so that the charged particles in the magnetic field are shifted to one side of the Hall effect device 2 under influence of Lorenz force. As a result, the Hall effect device generates a potential difference Vh commensurate with a strength of the applied magnetic field or the like, and outputs the generated potential difference Vh (which will be hereinafter referred to as an "output voltage" or a "Hall-effect electromotive force"). Accordingly, the strength of the magnetic field (magnetism) can be appreciated from measurement of the Hall-effect electromotive force. Thus, the Hall effect device 2 functions as a magnetic sensor for measuring a strength of a magnetic field (magnetism). In the first preferred embodiment, the Hall effect device is employed as a position detection sensor (position detector), using the property that the strength of a magnetic field varies according to positional relationship between the magnet 1 and the pair of Hall effect devices 2a and 2b.

FIG. 6 shows a distribution of magnetic flux density of the magnetic force generator. Specifically, FIG. 6 shows a distribution curve BC1 of magnetic flux density which is obtained when the magnet 1 is present in a reference position. It is noted that, in the present specification, a condition in which a center of the magnet 1 precisely corresponds to a center between the two Hall effect devices 2a and 2b is defined as a reference condition, and a position of the magnet 1 in the reference condition is defined as the reference position. In the reference condition, the Hall effect devices 2a and 2b are situated symmetrically with respect to the center of the magnet 1.

As shown in FIG. 6, each of the Hall effect devices (magnetic sensors) 2a and 2b detects a density of magnetic flux produced just thereabove. After detection, the Hall effect devices (magnetic sensors) 2a and 2b output Hall-effect electromotive forces Vha and Vhb commensurate with the magnetic flux densities detected by the Hall effect devices 2a and 2b, respectively. When the magnet 1 moves from the reference position in a direction in which the X axis extends (a direction indicated by an arrow "X" in FIG. 6, which will be hereinafter referred to as a "+X direction"), the distribution of the magnetic flux density changes into a distribution indicated by a distribution curve BC2. Accordingly, the Hall-effect electromotive force Vha (more precisely, an absolute value thereof) of the Hall effect device 2a out of the two Hall-effect devices becomes smaller than that observed in the reference condition, while the Hall-effect electromotive force Vhb (more precisely, an absolute value thereof) of the other Hall effect device 2b becomes larger than that observed in the reference condition. On the other hand, in a situation converse to the above situation, i.e., when the magnet 1 moves from the reference position in a direction reverse to the +X direction (which will be hereinafter referred to as a "−X direction"), the Hall-effect electromotive force of the Hall effect device 2a becomes larger than that observed in the reference condition while the Hall-effect electromotive force of the Hall effect device 2b becomes smaller than that observed in the reference condition. It is additionally noted that though a sign (plus or minus) of the Hall-effect electromotive force may be reversed depending on a direction of a magnetic flux detection axis BD (an axis used for detecting a magnetic flux) of each of the Hall effect devices as appreciated from FIG. 5 showing the principle of position detection, it is assumed in the present example that the Hall effect devices 2a and 2b are disposed thereof the Hall effect devices 2a and 2b are oriented in the same direction as illustrated in FIG. 3.

Then, a difference (a result of subtraction) between the respective Hall-effect electromotive forces Vha and Vhb of the Hall effect devices 2a and 2b is calculated as a value $\Delta V$ which is expressed by the following equation (1). The value $\Delta V$ is detected as a value representing a position X of the magnet 1 relative to the pair of Hall effect devices 2a and 2b.

$$\Delta V = Vha - Vhb \qquad \text{equation (1).}$$

More specifically, the processing circuit 3 includes differential amplifiers 31a and 31b, a subtractor 33, and a low pass filter 35, as illustrated in FIG. 4.

The differential amplifier 31a functions to obtain the Hall-effect electromotive force Vha corresponding to a difference between potentials Va1 and Va2 outputted from the Hall effect device 2a, and the differential amplifier 31b functions to obtain the Hall-effect electromotive force Vhb corresponding to a difference between potentials Vb1 and Vb2 outputted from the Hall effect device 2b. Then, the subtractor 33 functions to calculate a difference between the Hall-effect electromotive forces Vha and Vhb (=Vha−Vhb) as the value $\Delta V$. An output of the subtractor 33 passes through the low pass filter 35, to be supplied as an output representing the position X of the magnet 1 (position output).

Arrangement of Magnet and Hall Effect Devices.

Figure 7:
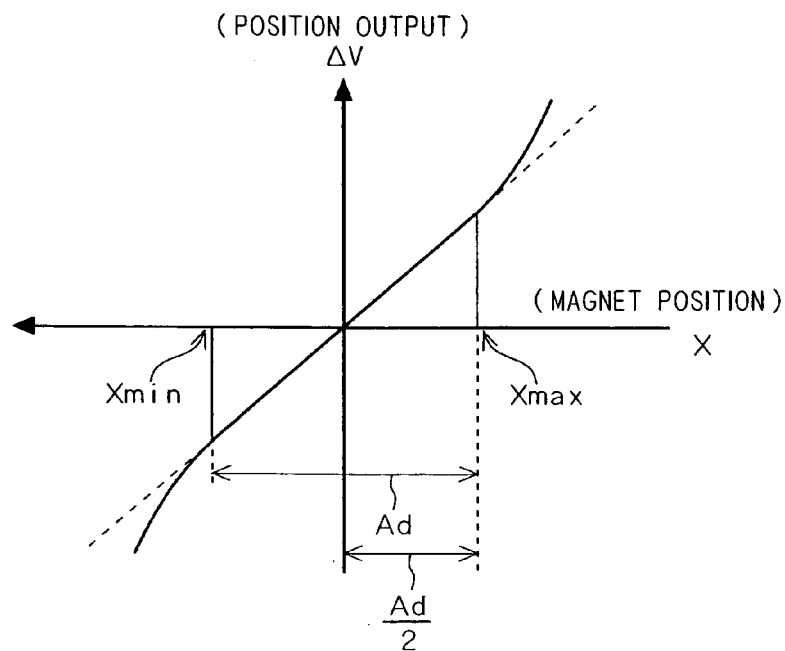
FIG. 7 shows relationship between the position X and the value ΔV.

There is a one-to-one correspondence between the value $\Delta V$ and the position X. Also, in order to satisfactorily detect the position of the magnet 1 relative to the pair of Hall effect devices 2a and 2b, it is preferable that excellent linearity exists between the position X and the value $\Delta V$ over a given portion of a movable range of the magnet 1 which corresponds to an allowable moving distance Ad of the magnet 1 as shown in FIG. 7. It is noted that the "allowable moving distance Ad" means an allowable range included in the movable range of the magnet 1 for detection of the position of the magnet 1 in the present specification. In the present example, the allowable moving distance Ad is equal to a difference between the maximum of the position on the X axis ("Xmax"=+Ad/2) and the minimum of the position on the X axis ("Xmin"=−Ad/2). The allowable moving distance Ad can be also referred to as a "position detection range". As long as the magnet 1 moves within the allowable moving distance, results of position detection produced by the position detector 10A can be considered correct.

In order to obtain excellent linearity between the position X and the value $\Delta V$, the size of the magnet 1 (magnet size Ms) which is, more precisely, the length (, which is also described as the width) of the magnet 1 is determined so that relationship expressed by the following equation (2) can be established between the space Hp between the Hall effect devices 2a and 2b (which is illustrated in FIG. 3 and will be also referred to as a "device-to-device distance Hp") and the magnet size Ms, on the X axis.

$$Ms \geq Hp \qquad \text{equation (2).}$$

That is, on the X axis, the magnet size Ms is set to be equal to or larger than the device-to-device distance Hp. It is noted that the "device-to-device distance Hp (or space Hp)" of the pair of Hall effect devices means a distance between respective side faces Fa and Fb facing each other of the two Hall effect devices (magnetic sensors) (in short, inside dimension between the Hall effect devices) as illustrated in FIG. 3, in the present specification.

Figure 8:
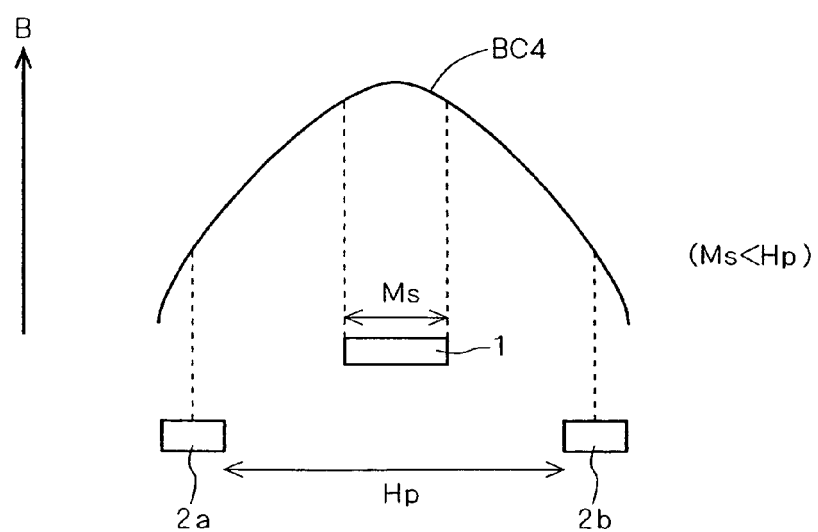
FIG. 8 illustrates a configuration of a position detector according to a comparative example and a distribution curve of magnetic flux density generated by the position detector according to the comparative example.

FIG. 8 shows a configuration of a position detector according to a comparative example and a distribution curve BC4 of magnetic flux density generated by the magnet 1 in the position detector according to the comparative example. In the position detector according to the comparative example, the magnet size Ms is set to be smaller than the space Hp (Ms<Hp). Turning to the distribution curve BC 4, it is appreciated that while the distribution curve BC 4 maintains relatively excellent linearity when the curve BC4 runs substantially along the length Ms of the magnet 1, the linearity decreases in increasing degrees as the curve BC4 becomes farther from each of opposite ends of the magnet 1. Accordingly, the magnetic flux density generated above each of the Hall effect devices shown in FIG. 8 is smaller than the magnetic flux density generated above each of the Hall effect devices shown in FIG. 3 (refer to a distribution curve BC5 of magnetic flux density in FIG. 9). Hence, the magnetic flux density generated above each of the Hall effect devices in FIG. 8 is more susceptible to influences of an external magnetic field. Since the magnetic flux density generated by the magnet 1 in the position detector according to the comparative example decreases in increasing degrees as it becomes farther from each of opposite ends of the magnet 1, it is difficult to ensure excellent linearity between the value $\Delta V$ and the position X.

In contrast thereto, in the configuration as illustrated in FIG. 3, the magnet size Ms is larger than that in FIG. 8. Thus, it is possible to increase a magnetic field density generated above each of the Hall effect devices as compared to that generated in the configuration where the magnet size Ms is relatively small (refer to FIG. 8). As a result, a magnetic field can be stabilized, being less subject to influences of an external magnetic field.

Figure 9:
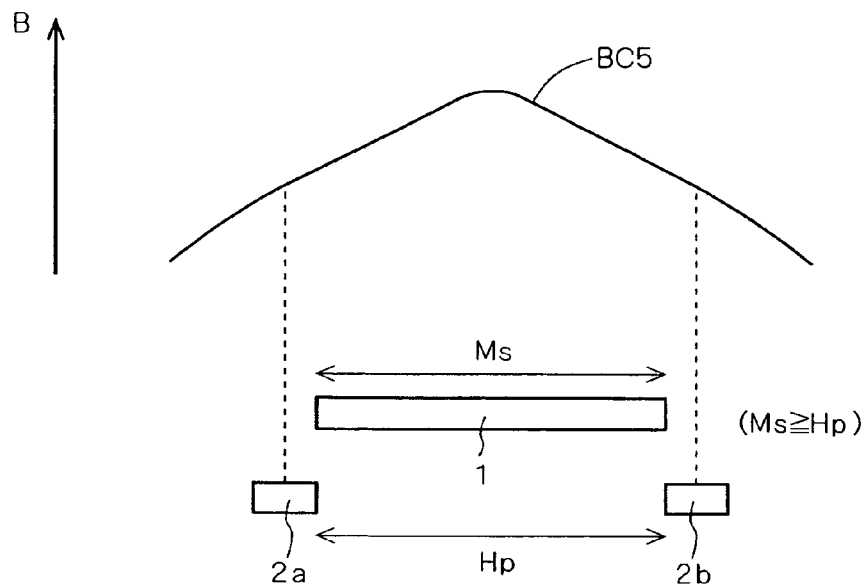
FIG. 9 shows a distribution curve of magnetic flux density generated by the position detector according to the first preferred embodiment, and others.

Further, by employing the configuration illustrated in FIG. 3, because of the magnetic size Ms which is larger than that in FIG. 8, it is possible to improve linearity of a portion of a distribution curve of magnetic flux density which runs above each of the Hall effect devices as shown by the distribution curve BC5 in FIG. 9. This ensures high linearity between the value $\Delta V$ and the position X. It is additionally noted that FIG. 9 shows the distribution curve BC5 of magnetic flux density generated in a position detector including the configuration illustrated in FIG. 3, and the others.

As is made clear from the foregoing, by determining the magnet size Ms so that the relationship expressed by the equation (2) can be established, it is possible to suppress influences of an external magnetic field, to thereby achieve highly accurate position measurement.

Also, it is more preferable to determine the magnet size Ms so that relationship expressed by the following equation (3) can be established among the magnet size Ms, the device-to-device distance Hp, and the allowable moving distance Ad on the X axis. That is, the magnet size Ms is preferably equal to or larger than a sum of the device-to-device distance Hp and the allowable moving distance Ad on the X axis.

$$Ms \geq Hp + Ad \qquad \text{equation (3).}$$

For example, when Hp is 3 mm and Ad is 2 mm, Ms can preferably be set to 5 mm.

Figure 10:
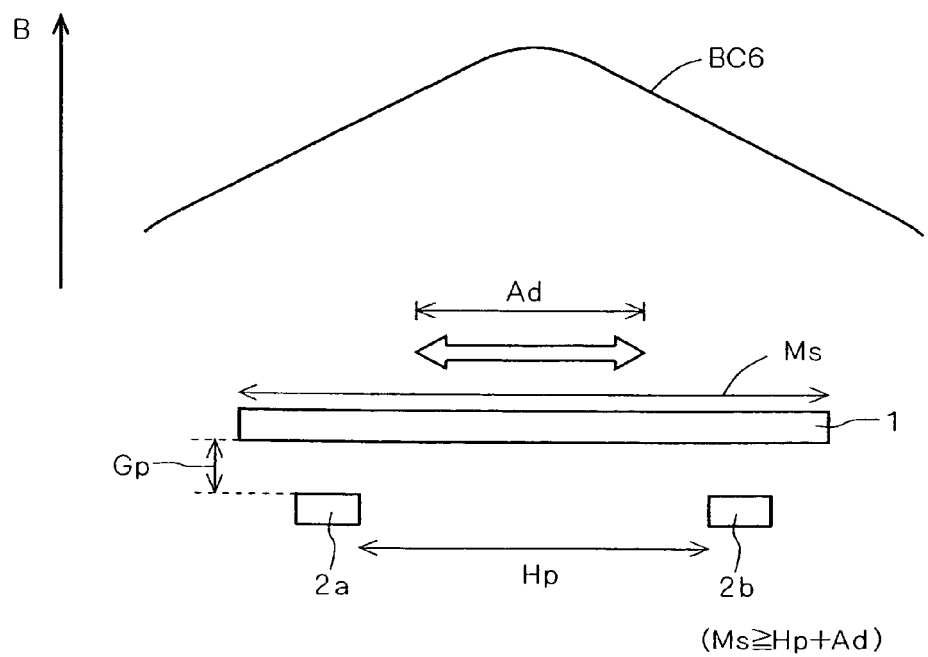
FIG. 10 shows a distribution curve of magnetic flux density generated by a position detector according to a modification of the first preferred embodiment, and others.

FIG. 10 illustrates a configuration of a position detector in which the relationship expressed by the equation (3) is established, and a distribution curve BC6 of magnetic flux density generated by that position detector.

The configuration illustrated in FIG. 10 can suppress influences of an external magnetic field, similarly to the configuration illustrated in FIG. 3. In the equation (3), the lower limit of the magnet size Ms (i.e., a value of the magnet size Ms provided when Ms is equal to (Hp+Ad)) is greater than that in the equation (2) by a value of the allowable moving distance Ad. As such, a magnetic flux density generated above each of the Hall effect devices can be further increased. Accordingly, a magnetic field can be further stabilized, being further less subject to influences of an external magnetic field. Since the lower limit of the magnet size Ms in the equation (3) is greater than that in the equation (2) by a value of the allowable moving distance Ad, linearity of a portion of the distribution curve BC6 which runs above each of the Hall effect devices can be further enhanced. Consequently, it is possible to ensure much higher linearity between the value $\Delta V$ and the position X over a portion of the movable range of the magnet 1 which corresponds to the allowable moving distance Ad.

As is made clear from the foregoing, by determining the magnet size Ms so that the relationship expressed by the equation (3) can be established, it is possible to suppress influences of an external magnetic field, to thereby achieve highly accurate position measurement.

Further, even in a case where the allowable moving distance Ad of the magnet 1 is relatively large, in particular, in a case where the allowable moving distance Ad of the magnet 1 is equal to or larger than the device-to-device distance Hp (refer to the following equation (4)), it is still possible to achieve high accurate position detection by establishing the relationship expressed by the equation (3).

$$Ad \geq Hp \qquad \text{equation (4).}$$

More specifically, even in a case where the allowable moving distance Ad of the magnet 1 is set to be relatively large (in particular, equal to or larger than the device-to-device distance Hp), by setting the magnet size Ms to be equal to or larger than a sum of the device-to-device distance Hp and the allowable moving distance Ad (refer to the equation (3)), it is possible to suppress influences of an external magnetic field and the like, to thereby achieve high accurate measurement. In other words, it is possible to set the allowable moving distance to be relatively large while suppressing influences of an external magnetic field.

In a strict sense, a magnetic flux detected by each of the Hall effect devices 2a and 2b varies also according to a distance Gp between a top surface of the Hall effect device 2a or 2b and a lower surface of the magnet 1 (which will be also referred to as a "gap size Gp"). For example, in a situation where the gap size Gp is set to be relatively large, a magnetic flux detected by each of the Hall effect devices is relatively small. Even in such situation, by determining the magnet size Ms so that the relationship expressed by the equation (3) can be established, it is possible to suppress influences of an external magnetic field and the like. Also, by setting the magnet size Ms to be a much higher value which easily satisfies the equation (3), it is possible to further suppress influences of an external magnetic field.

Also, a magnetic flux detected by each of the Hall effect devices 2a and 2b varies also according to a thickness of the magnet 1. For example, in a situation where the thickness of the magnet 1 is small (in other words, the magnet 1 is thin), a magnetic flux detected by each of the Hall effect devices is relatively small. Even in such situation, by determining the magnet size Ms so that the relationship expressed by the equation (3) can be established, it is possible to suppress influences of an external magnetic field and the like. Also, by setting the magnet size Ms to a much higher value which easily satisfies the equation (3), it is possible to further suppress influences of an external magnetic field.

Sensitivity Adjustment

In the meantime, even when excellent linearity exists between the value $\Delta V$ and the position X, an inclination of a straight line representing the linearity varies due to changes in various factors such as temperature change in some cases. In other words, sensitivity of the value $\Delta V$ to change in the position X may vary.

To allow for such variation, the position detector 10A functions to adjust an input voltage applied to each of the Hall effect devices (magnetic sensor) 2a and 2b so as to keep a sum (result of addition) of the above-mentioned Hall-effect electromotive forces Vha and Vhb constant, in detecting the value (difference) $\Delta V$. In this manner, adjustment (sensitivity adjustment) which allows normalization of the difference $\Delta V$ can be achieved. As the Hall-effect electromotive force has a property of varying according to not only a strength of a magnetic field but also a magnitude of an input voltage. Hence, the above-described adjustment of the input voltages corresponds to sensitivity adjustment using the foregoing property of the Hall-effect electromotive force.

Below, details about adjustment sensitivity briefly mentioned above will be given.

As illustrated in FIG. 4, the processing circuit 3 includes an adder 34, a calculator 36, and a power supply controller 37. Each of the input voltages Vin applied to the Hall effect devices 2a and 2b is controlled such that a result of addition (sum) of the output voltages (Hall-effect electromotive forces) Vha and Vhb is constant, using those elements 34, 36 and 37.

More specifically, the adder 34 functions to obtain the sum of the output voltages Vha and Vhb (Vha+Vhb), and the calculator 36 calculates a difference between the sum and a predetermined value Vct (Vct−(Vha+Vhb)). The power supply controller 37 controls the input voltage Vin such that the sum (Vha+Vhb) is equal to the predetermined value Vct based on an output (Vct−(Vha+Vhb)) of the calculator 36. In particular, when the sum (Vha+Vhb) is larger than the predetermined value Vct, the power supply controller 37 reduces the input voltage Vin. On the other hand, when the sum (Vha+Vhb) is smaller than the predetermined value Vct, the power supply controller 37 increases the input voltage Vin. The power supply controller 37 exercises feedback control in controlling the input voltage Vin such that the sum (Vha+Vhb) is equal to the predetermined value Vct.

As described above, the processing circuit 3 controls each of the input voltages Vin applied to the Hall effect devices 2a and 2b such that the sum of the output voltages (output values) of the Hall effect devices 2a and 2b (Vha+Vhb) is equal to the predetermined value Vct, and then detects and outputs the value $\Delta V$ which is equal to a difference between the output voltages (output values) of the Hall effect devices 2a and 2b, as the position output.

The above-described control facilitates adjustment of the sensitivity which may vary due to changes in various factors such as temperature change. It is noted that the changes in the various factors which can be compensated for, include variation among individual magnets, degradation of a magnet, and the like, in addition to temperature change.

Additionally, though the processing circuit 3 controls the input voltage Vin such that a sum of the Hall-effect electromotive forces (Vha+Vhb) is constant in the first preferred embodiments, the present invention is not limited to the first preferred embodiment. Alternatively, an input current Iin flowing into the Hall effect devices may be controlled such that a sum of the Hall-electromotive forces (Vha+Vhb) is constant.

Further, in the first preferred embodiment, each of Hall effect devices is disposed such that the respective magnetic flux detection axes thereof are oriented in the same direction. However, the present invention is not limited to the first preferred embodiment. For example, the pair of Hall effect devices illustrated in FIG. 3 may alternatively be disposed such that the respective magnetic flux detection axes BD of the two Hall effect devices are oriented in opposite directions. In such alternative example, control of the input voltages applied to the Hall effect devices 2a and 2b for keeping a sum of magnitudes of output values (i.e., absolute output values) of the Hall effect devices 2a and 2b constant can be accomplished by inverting a sign (plus or minus) of the output value of one of the Hall effect devices 2a and 2b, or the like. And a difference in magnitude between the output values of the Hall effective devices 2a and 2b can be obtained as the position output. In this manner, the same effects as described above can be produced.

Further Improvement in Linearity

In the above description, techniques of determining the magnet size or the like based on the equation (2) or the equation (3) so that excellent linearity can exist between the value ΔV and the position X has been discussed by way of example. Relatively excellent linearity can be achieved by utilizing the above-described techniques. However, linearity between the value ΔV and the position X can be further enhanced by utilizing techniques which will be described in detail below.

In order to ensure linearity between the value ΔV and the position X, ideally, each of portions of a distribution curve of magnetic flux density which run above the two Hall effective devices, respectively, has linearity as illustrated in FIG. 10. For example, it is desirable that a portion of the distribution curve of magnetic flux density running above the Hall effect device 2a is one straight line which extends upward to the right, and a portion of the distribution curve of magnetic flux density running above the other Hall effect device 2b is another straight line which has the same inclination as the one straight line and extends downward to the right (in other words, a straight line having an inclination with a reversed sign and the same absolute value with respect to the inclination of the one straight line). As a result of achievement of such distribution curve of magnetic flux density, linearity between the value ΔV and the position X can be satisfactorily ensured.

Also, even in a case where each of respective portions of the distribution curve of magnetic flux density which run above the Hall effect devices does not have linearity, high linearity between the value ΔV and the position X can be ensured if a difference between increment (an absolute value thereof) in the Hall-effect electromotive force of one of the two Hall effect devices and decrement in the Hall-effect electromotive force of the other Hall effect device is constant whichever value the position X may take.

However, it is actually difficult to ensure complete linearity between the value ΔV and the position X only by maintaining linearity of each of respective portions of the distribution curve of magnetic flux density which run above the Hall effect devices. As such, it is desired to implement a position detector which provides for much higher linearity, using the following techniques. Specifically, an evaluation value associated with an evaluation coefficient used for evaluating linearity is calculated by simulation. The suitable magnet size Ms and the like can be determined to be a suitable value based on the calculated evaluation value.

The following discussion will refer to linearity between the value ΔV and the position X in a case where the above-described control is exercised (specifically, in a case where the difference ΔV between the Hall-effect electromotive forces is detected as the position output with input voltages applied to the two Hall effect devices 2a and 2b having been adjusted so as to make the sum of the two Hall-effect electromotive forces Vha and Vhb constant).

First, it is assumed that a residual magnetic flux density of the magnet 1 is 1060 mT, the allowable moving distance Ad of the magnet 1 is 2 mm, the device-to-device distance Hp is 3 mm, and the gap size Gp is 3 mm. Under the foregoing conditions, a suitable value for the magnet size Ms is to be obtained by way of example. In the present example, the magnet 1 is of a type that includes a square in the X-Y plane, and the magnet size Ms corresponds to a length of one side of the square of the magnet 1 are prepared. Then, seven sample sizes of 2 mm, 3 mm, 4 mm, 5 mm, 6 mm, 7 mm, and 8 mm are prepared as the magnetic size, and one of the seven sample sizes is to be selected as an optimal magnet size.

Figure 11:
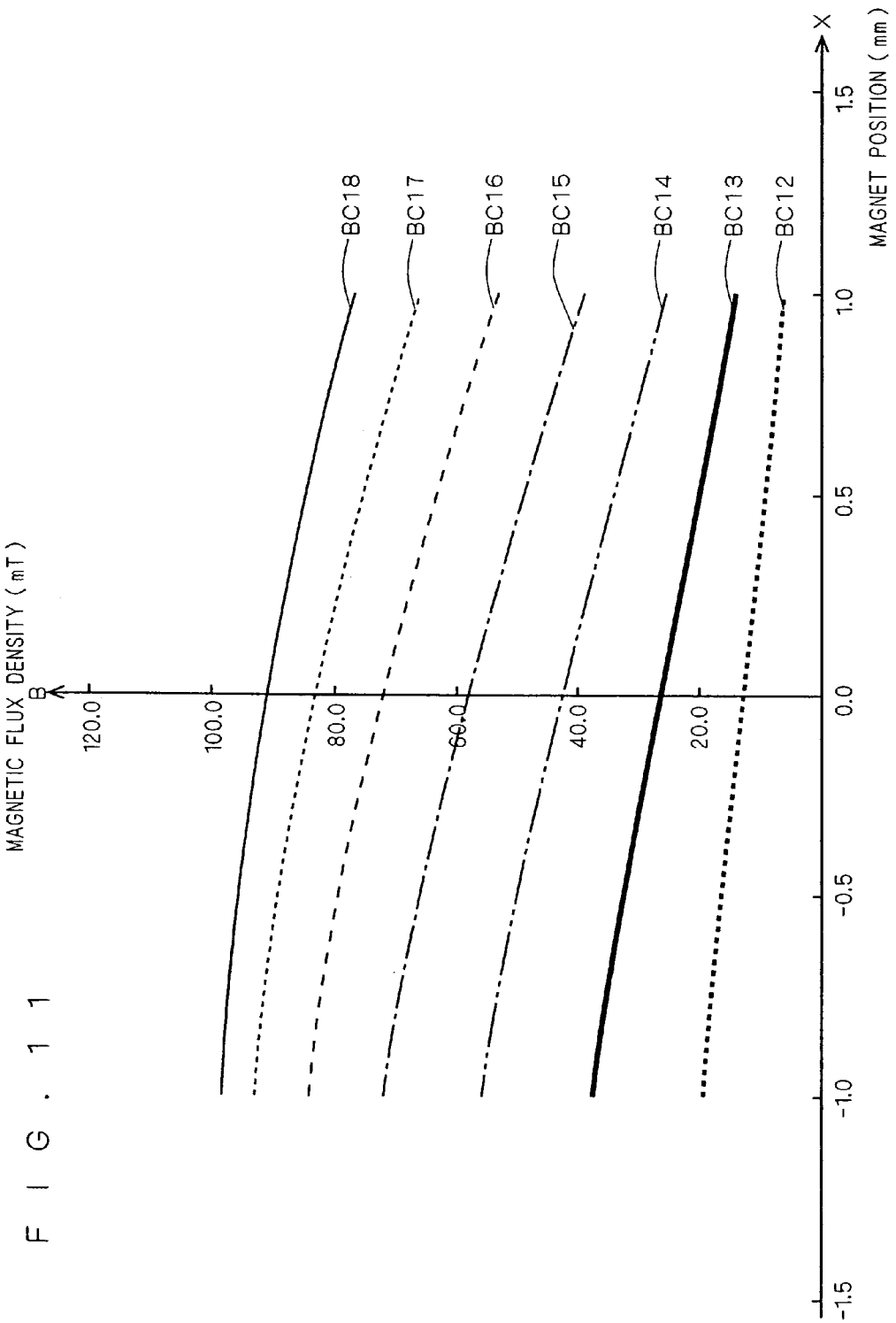
FIG. 11 shows distribution curves of magnetic flux densities generated in cases a magnet size is set to different sample sizes.

FIG. 11 shows magnetic flux densities generated around the Hall effect device 2b when the magnet 1 moves 2 mm along the X axis (more precisely, when the magnet 1 moves from the position X=−1 mm to the position X=+1 mm), in cases where the magnet size Ms is set to the seven sample sizes, respectively. In FIG. 11, coordinate axes are provided such that X is equal to zero when the magnet 1 is situated in the reference position. FIG. 11 is a graph including distribution curves BC12, BC 13, BC14, BC 15, BC16, BC17, and BC18 of magnetic flux densities which are provided in the cases where the magnet size Ms is set to 2 mm, 3 mm, 4 mm, 5 mm, 6 mm, 7 mm, and 8 mm, respectively. It is appreciated from FIG. 11 that the magnetic flux density as a whole increases as the magnet size Ms increases. Additionally, distribution curves of magnetic flux densities generated around the Hall effect device 2a in cases where the magnet size Ms is set to the seven sample sizes and the distribution curves shown in FIG. 11 should be symmetrical with respect to any point at which X=0, though the distribution curves of magnetic flux densities generated around the Hall effect device 2a are not shown in FIG. 11.

Figure 12:
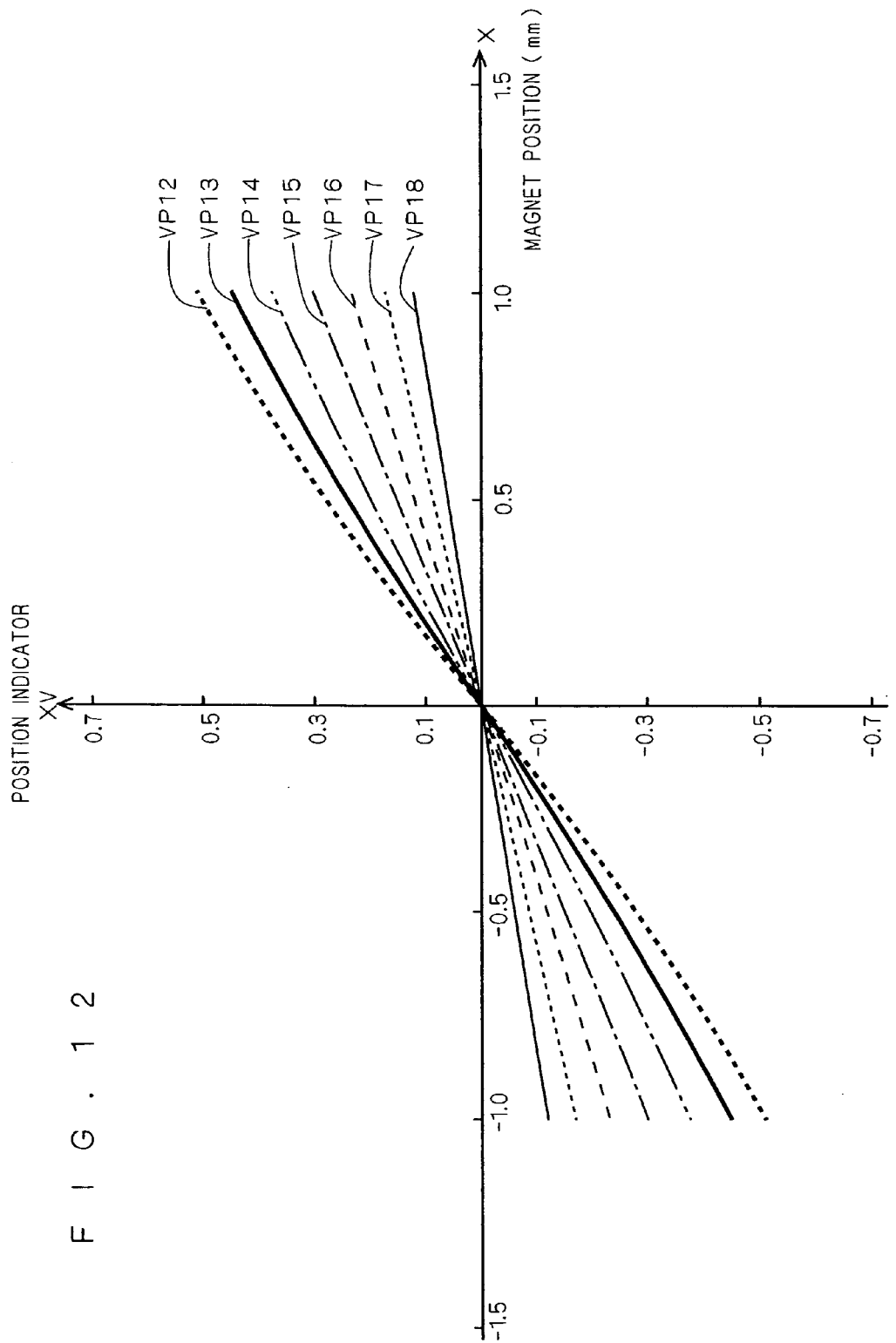
FIG. 12 shows position indicators obtained by using the distribution curves shown in FIG. 11.

FIG. 12 is a graph using a position indicator XV as one coordinate axis. The position indicator XV is obtained by dividing difference between respective magnetic flux densities generated above the two Hall effect devices 2a and 2b by the sum of the respective magnetic flux densities generated above the two Hall effect devices 2a and 2b. Curves VP12, VP13, VP14, VP15, VP16, VP17, and VP18 shown in FIG. 12 represent relationships each between the position of the magnet and the position indicator, in the case where the magnet size Ms is set to 2 mm, 3 mm, 4 mm, 5 mm, 6 mm, 7 mm, and 8 mm, respectively. The Hall-effect electromotive force of each of the Hall effect devices is proportional to a magnetic flux density. Accordingly, the position indicator XV is equivalent to a normalized value of the value ΔV, which is obtained by dividing the value ΔV by a sum of Hall-effect electromotive forces of the two Hall effect devices. In other words, the position indicator XV is equivalent to the value ΔV outputted in a condition where the input voltages applied to the Hall effect devices are controlled by the processing circuit 3 in the above-described manner.

Turning to the graph of FIG. 12, one of the curves VP12, VP13, VP14, VP15, VP16, VP17, and VP18 which most greatly resembles a straight line is a curve having the highest linearity.

Figure 13:
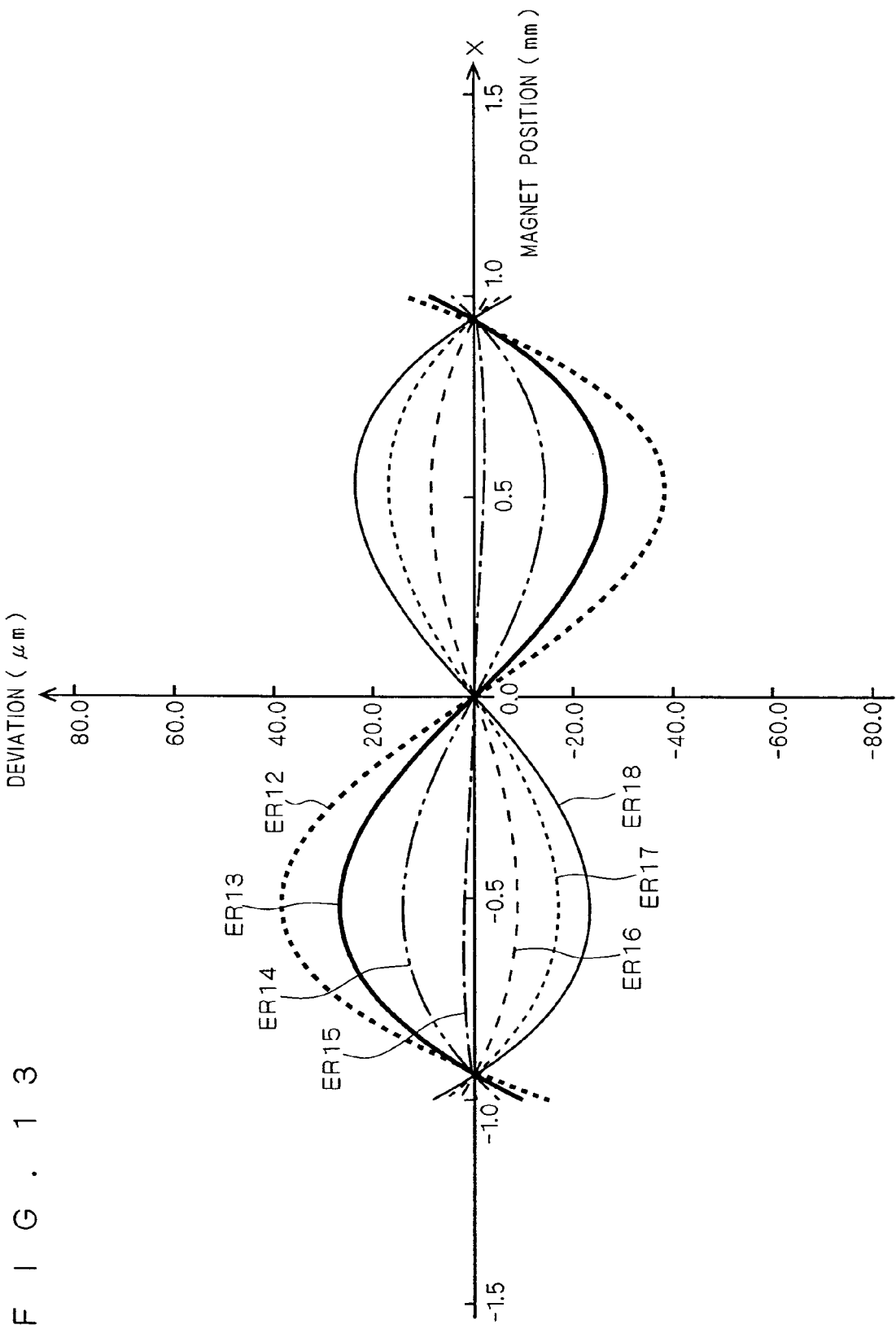
FIG. 13 shows linearity of curves shown in FIG. 12.

FIG. 13 shows linearity of the curves shown in FIG. 12. Specifically, FIG. 13 is a graph including curves ER12, ER13, ER14, ER15, ER16, ER17, and ER18 representing respective deviations of the curves VP12, VP13, VP14, VP15, VP16, VP17, and VP18 with respect to regression lines thereof. Each of the deviations is indicated in micrometers in FIG. 13.

It is appreciated from FIG. 13 that when the magnet size Ms is set to 5 mm, the deviation is the smallest, i.e., the linearity of the corresponding curve has the highest linearity. When the magnet size Ms is set to 5 mm, the deviation is a few micrometers at the maximum, so that extremely excellent linearity can be ensured.

The maximum deviation of each of the curves is calculated, and is used as an evaluation value F for evaluating linearity, for example. Then, one of the sample sizes which produces the optimal (the smallest in the present example) evaluation value F is selected to be actually employed as the magnet size Ms.

Unlike the above-described manner, a sum (or a mean value) of plural deviations at plural points on each of the curves in FIG. 13 may alternatively be calculated and used as the evaluation value for evaluating linearity. Then, one of the sample sizes which produces the optimal (the smallest in the present example) evaluation value F is selected to be actually employed as the magnet size Ms. Further alternatively, in a situation where the optimal sample size cannot be employed as the magnet size Ms due to various constraints, another sample size which is different from the optimal sample size but produces the evaluation value F meeting the predetermined standards may be selected. In the further alternative example, a predetermined threshold value TH1 is provided, and a given sample size is qualified as a suitable magnet size if the given sample size produces the evaluation value F which is more suitable (in particular, smaller) than the predetermined threshold value TH1, for example.

With the use of the above-described techniques for designing a position detector, it is possible to determine the magnet size Ms of the magnet 1 so that the evaluation value F for evaluating linearity of a curve representing change in the difference ΔV which is responsive to change in position of the magnet 1 can meet the predetermined standards. Accordingly, relatively excellent linearity can be ensured. Even in a situation where a sum of Hall-effect electromotive forces outputted from the Hall effect devices 2a and 2b is not always kept at a fixed value during change of the position X because of non-linearity of the distribution curve of magnetic flux density, excellent linearity between the value ΔV and the position X can be ensured.

Further, a suitable value of the magnet size Ms is obtained without taking into consideration influences of an external magnetic field in the present example. However, a magnetic flux density is preferably high in order to suppress influences of an external magnetic field. Accordingly, it is preferable that the magnet size Ms is set to a value which produces the evaluation value F meeting the predetermined standards in the above-described simulation, as well as satisfies the relationship expressed by either the equation (2) or the equation (3), when reduced to practice.

Additionally, the present example has referred to the techniques of determining the magnet size Ms based on the evaluation value F in a case where the input voltages applied to the Hall effect devices 2a and 2b are controlled such that a sum of two Hall-effect electromotive forces is constant. However, the present invention is not limited to that example. Alternatively, the magnet size Ms can be determined based on the evaluation value F or the like in the same manner as described above also in a case where the processing circuit 3 does not include the adder 34, the calculator 36, and the power supply controller 37, and the value ΔV is detected as the position output without controlling the input voltages applied to the Hall effect devices 2a and 2b, for example. Also in this alternative example, linearity between the value ΔV and the position X can be improved.

B. Second Preferred Embodiment

Next, a second preferred embodiment of the present invention will be described. A position detector 10B according to the second preferred embodiment allows two-dimensional detection of a position of the magnet 1 relative to the Hall effect devices 2. The second preferred embodiment is a modification of the first preferred embodiment. In the second preferred embodiment, therefore, description will be given mainly about points of differences between the first and second preferred embodiments.

Figure 14:
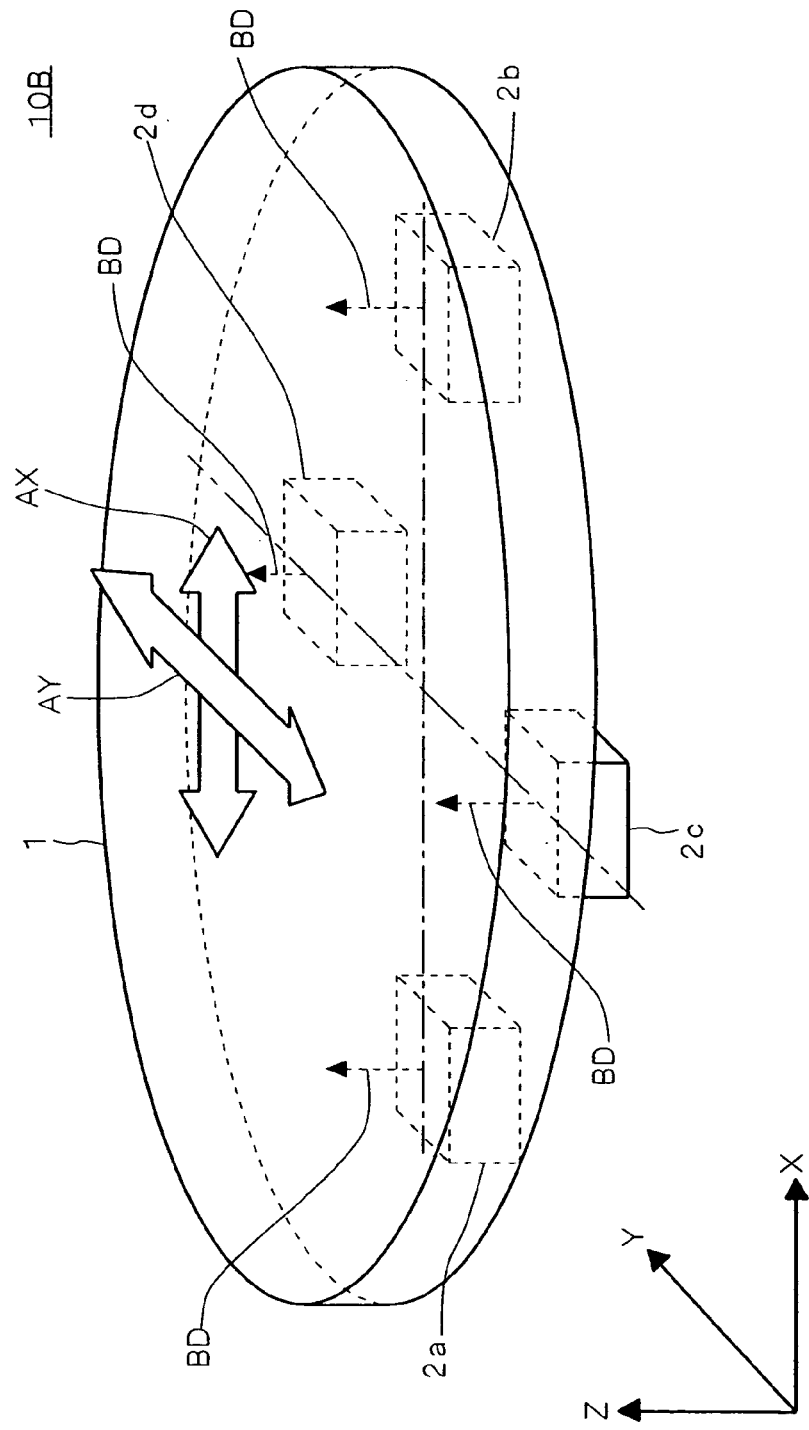
FIG. 14 is a perspective view of a position detector according to a second preferred embodiment.

FIG. 14 is a perspective view of the position detector 10B according to the second preferred embodiment. As illustrated in FIG. 14, the position detector 10B includes four Hall effect devices, more precisely, two pairs of Hall effect devices (magnetic sensors) (2a, 2b) and (2c, 2d). More specifically, one of the two pairs of Hall effect devices (2a, 2b) is provided such that the Hall effect devices 2a and 2b are spaced from each other along the X axis, and the other pair (2c, 2d) is provided such that the Hall effect devices 2c and 2d are spaced from each other along the Y axis.

Then, a sensor array which is formed of the Hall effect device 2a and 2b and extends along the X axis and a sensor array which is formed of the Hall effect devices 2c and 2d and extends along the Y axis intersect each other at right angles to be arranged in the shape of a cross with respective centers of the sensor arrays overlapping each other.

The magnet 1 is movable along the X axis along which the Hall effect devices 2a and 2b are arranged (i.e., along the space between the devices 2a and 2b) and also movable along the Y axis along which the Hall effect devices 2c and 2d are arranged (i.e., along the space between the devices 2c and 2d), in a plane parallel to a plane in which the pairs of Hall effect devices (2a, 2b) and (2c, 2d) are arranged, as indicated by two-headed arrows AY and AX in FIG. 14.

Further, a processing circuit similar to the processing circuit 3 described above is provided for each of the two pairs of Hall effect devices. Each of the processing circuits controls input voltages applied to the corresponding pair of Hall effect devices such that a sum of output values of the Hall effect devices in the corresponding pair is constant, in the same manner as in the first preferred embodiment. More specifically, one of the processing circuits exercises feedback control in which each of the input voltages Vin applied to the Hall effect device 2a and 2b is controlled such that a sum of output values of the Hall effect devices 2a and 2b is constant. Likewise, the other processing circuits exercises feedback control in which each of the input voltages Vin applied to the Hall effect devices 2c and 2d is controlled such that a sum of output values of the Hall effect devices 2c and 2d is constant.

Moreover, each of the Hall effect devices 2a, 2b, 2c, and 2d is disposed such that respective magnetic flux density axes thereof BD are oriented in the same direction. As a result, in the pair of Hall effect devices (2c, 2d), as well as in the pair of Hall effect devices (2a, 2b), as a magnetic flux detected by one of the two Hall effect devices increases with movement of the magnet 1, a magnetic flux detected by the other decreases. Hence, a processing circuit similar to the processing circuit 3 can be employed for the Hall effect devices 2c and 2d.

The processing circuits output the value ΔV supplied from the pair of Hall effect devices (2a, 2b) and the value ΔV supplied from the pair of Hall effect devices (2c, 2d). It is noted that the value ΔV supplied from the pair of Hall effect devices (2a, 2b) represents a position of the magnet 1 on the X axis, and will be also referred to as a "value ΔVx", and the value ΔV supplied from the pair of Hall effect devices (2c, 2d) represents a position of the magnet 1 on the Y axis, and will be also referred to as a "value ΔVy"

Output signals are inputted from the processing circuits to the CPU 5, and the CPU 5 the values ΔVx and ΔVy which are results of subtraction of respective output values of the two pairs of Hall effect devices, as position outputs for positions on the X axis and the Y axis. It is noted that each of the Hall effect devices provides an output value thereof under the above-described feedback control. More specifically, the CPU 5 numerically specifies the position x of the magnet 1 on the X axis based on the value Δ Vx by referring to the correspondence between the value ΔVx and the position x on the X axis. Also, the CPU 5 numerically specifies a position y of the magnet 1 on the Y axis based on the value ΔVy by referring to the correspondence between the value ΔVy and the position y on the Y axis.

Two-dimensional position detection with the X axis and the Y axis (x, y) can be achieved in the foregoing manner.

In the meantime, the size of the magnet 1 of the position detector 10B is determined so that not only a dimension on the X axis but also a dimension on the Y axis satisfies the relationship expressed by the equation (3). Alternatively, the size of the magnet 1 of the position detector 10B may be determined so that each of a dimension on the X axis and a dimension on the Y axis satisfies the relationship expressed by the equation (2). Further alternatively, other parameters Ad and Hp may be determined so that the relationship expressed by the equation (4) can be established, provided that the relationship expressed by the equation (3) is satisfied.

As a result, in the second preferred embodiment, high accurate position measurement on the X axis can be achieved in the same manner as in the first preferred embodiment, and further, high accurate position measurement on the Y axis can be achieved.

Also, the position detector 10B according to the second preferred embodiment, in which the two pairs of Hall effect devices are disposed to extend along different axes, allows detection of positions on two axes distinct from each other. In particular, since the axes along which the two pairs of the Hall effect devices extend, respectively, (i.e., the axes along the respective spaces in the two pairs) are perpendicular to each other, two-dimensional position detection can be more easily achieved. Additionally, though it has been described hereinabove that the respective spaces of the two pairs of Hall effect devices are perpendicular to each other by way of example, the angle between the two pairs of the Hall effect devices is not limited to right angles. The two pairs of Hall effect devices may be arranged such that a straight line between the Hall effect devices in one of the two pairs and a straight line between the Hall effect devices in the other pair intersect at an arbitrary angle to each other.

Moreover, the four Hall effect devices 2a, 2b, 2c and 2d forming the two pairs of Hall effect devices are arranged symmetrically with respect to a given point in the third preferred embodiment. As a result, occurrence of an error in measurement due to anisotropy can be suppressed.

Figure 15:
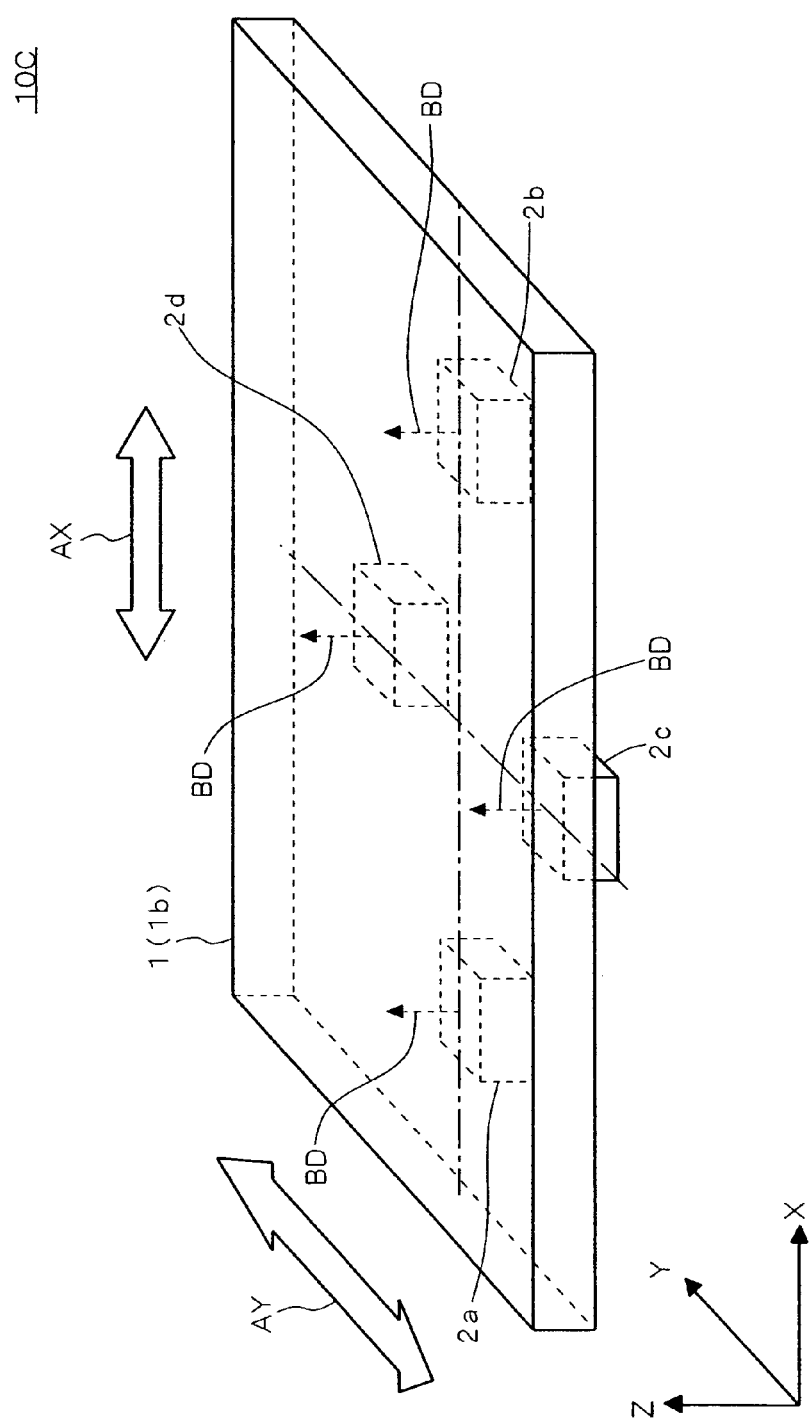
FIG. 15 is a perspective view of a position detector according to a modification of the second preferred embodiment.

It is additionally noted that though the magnet 1 is cylindrical in the second preferred embodiment, the shape of the magnet 1 is not limited to a cylindrical shape in the present invention. FIG. 15 illustrates a position detector 10C according to a modification of the second preferred embodiment. The magnet 1 (1b) may alternatively be in the shape of a rectangular parallelepiped, for example, as illustrated in FIG. 15. To employ the shape of a rectangular parallelepiped can reduce manufacturing costs for a position detector. However, it is preferable that the magnet 1 is cylindrical in order to improve accuracy. This is because a cylindrical magnet shows a distribution of magnetic flux density which is in a concentric pattern about a central axis of the cylindrical shape of the magnet, so that symmetry of the distribution of magnetic flux density can be ensured, to thereby achieve more accurate position detection.

C. Third Preferred Embodiment

In a third preferred embodiment of the present invention, a specific example of application of a position detector will be described. Below, an example in which one of the above-described position detectors is applied to a camera-shake compensation mechanism of an image capture apparatus will be described. For conformation, it is noted that the present invention is applicable both to an image capture apparatus of a type that captures a still image (such as a digital still camera) and an image capture apparatus of another type that captures a moving image (such as a digital movie camera).

Figure 16:
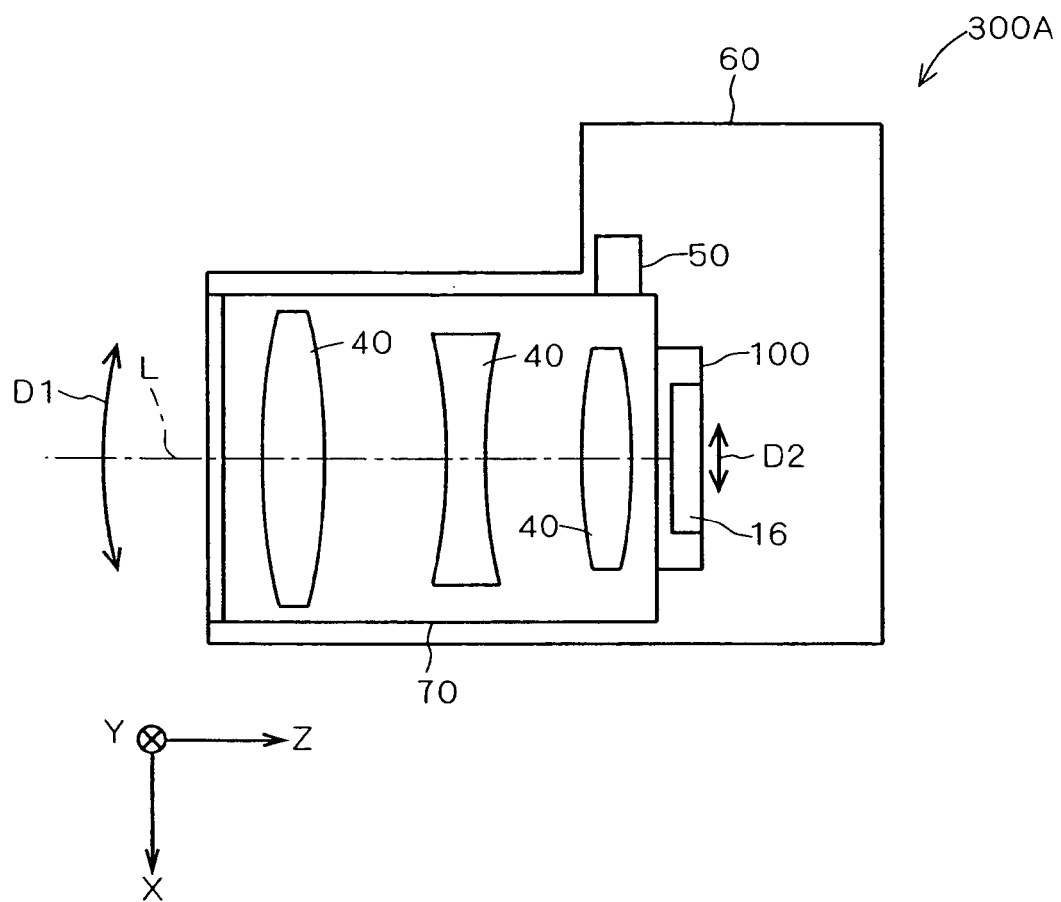
FIG. 16 illustrates an image capture apparatus incorporating a position detector.

FIG. 16 illustrates an image capture apparatus 300A (a digital still camera in this example) which also functions to compensate for camera shake. The image capture apparatus 300A includes a camera body 60, a lens barrel 70 in which a plurality of lenses 40 are mounted, a gyro sensor 50 secured to a side face of the lens barrel 70, and a camera-shake compensation apparatus 100 attached to an end face of the lens barrel 70.

In the camera-shake compensation apparatus 100, an imaging device 16 such as a CCD is provided. The camera-shake compensation apparatus 100 moves the imaging device 16 in an X-Y plane perpendicular to an optical axis L in response to shake of the image capture apparatus 300A which is detected by the gyro sensor 50, to compensate for camera shake. For example, consider a situation where the image capture apparatus 300A shakes as indicated by a two-headed arrow D1 in FIG. 16 in photographing using the image capture apparatus 300A, so that the optical axis L of light incident upon the lens barrel 70 deviates. In such situation, the camera-shake compensation apparatus 100 moves the imaging device 16 as indicated by a two-headed arrow D2 in FIG. 16, to thereby compensate for the deviation of the optical axis L. The camera-shake compensation apparatus 100 incorporates a position detection function of a position detector, and is configured to detect a current position of the imaging device 16 in the X-Y plane by performing the position detection function in compensating for camera-shake and to use information about the current position of the imaging device 16 as feedback information for controlling the position of the imaging device 16 with high accuracy.

Figure 17:
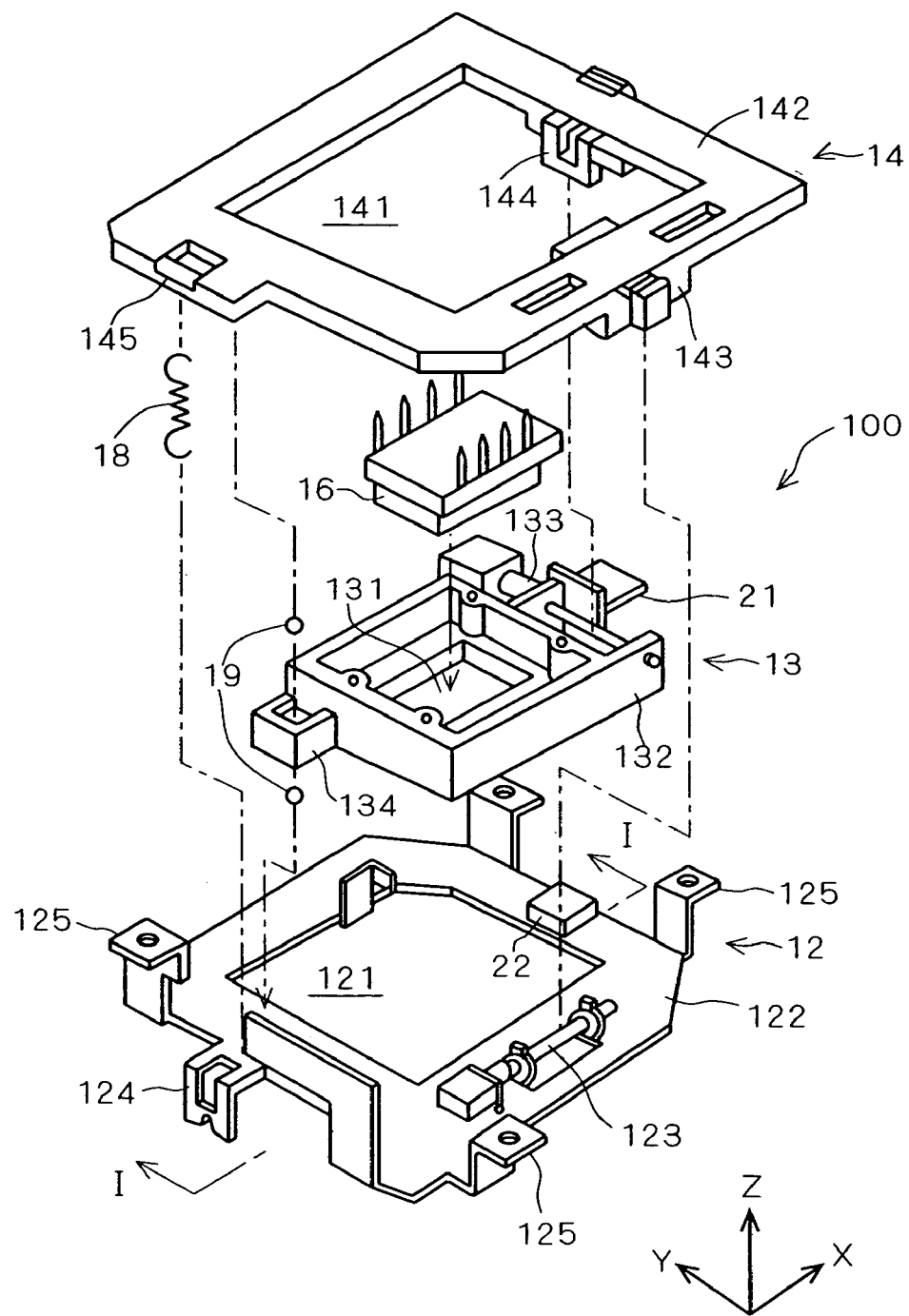
FIG. 17 is an exploded perspective view of a camera-shake compensation apparatus.

FIG. 17 is an exploded perspective view of the camera-shake compensation apparatus 100. As illustrated in FIG. 17, the camera-shake compensation apparatus 100 includes an assemblage formed of three parts of: a base plate 12 secured to the end face of the lens barrel 70; a first slider 14 which is movable relative to the base plate 12 along an X axis; and a second slider 13 which is movable relative to the first slider 14 along a Y axis, as principal parts.

The base plate 12 includes a metal frame 122 which is annular by inclusion of an opening 121 at a center thereof, as a base material. The metal frame 122 is secured to the lens barrel 70. The base plate 12 further includes a first actuator 123 extending along the X axis and a magnetic sensor unit 22 including a plurality of Hall effect devices. The first actuator 123 and the magnetic sensor unit 22 are provided on the metal frame 122. Further, a first spring hanger 124 is provided in a predetermined position in an outer edge of the metal frame 122, and L-shaped substrate supports 125 are provided in respective positions in the outer edge of the metal frame 122.

The second slider 13 includes a frame 132 which is made of resin and includes an opening 131 at a center thereof. The imaging device 16 can be fit in the opening 131 of the frame 132 and secured to the frame 132. The second slider 13 further includes a second actuator 133 extending along the Y axis, a hard sphere pocket 134 in which hard spheres 19 are fit with clearance while being located on opposite faces of the pocket 134 along a Z axis, and a magnet support 21 for supporting a magnet. The second actuator 133, the hard sphere pocket 134 and the magnet support 21 are provided on the frame 132. The magnet support 21 is situated outwardly from the second actuator 133 relative to the opening 131, so as to face the magnetic sensor unit 22 provided in the base plate 12.

Figure 18:
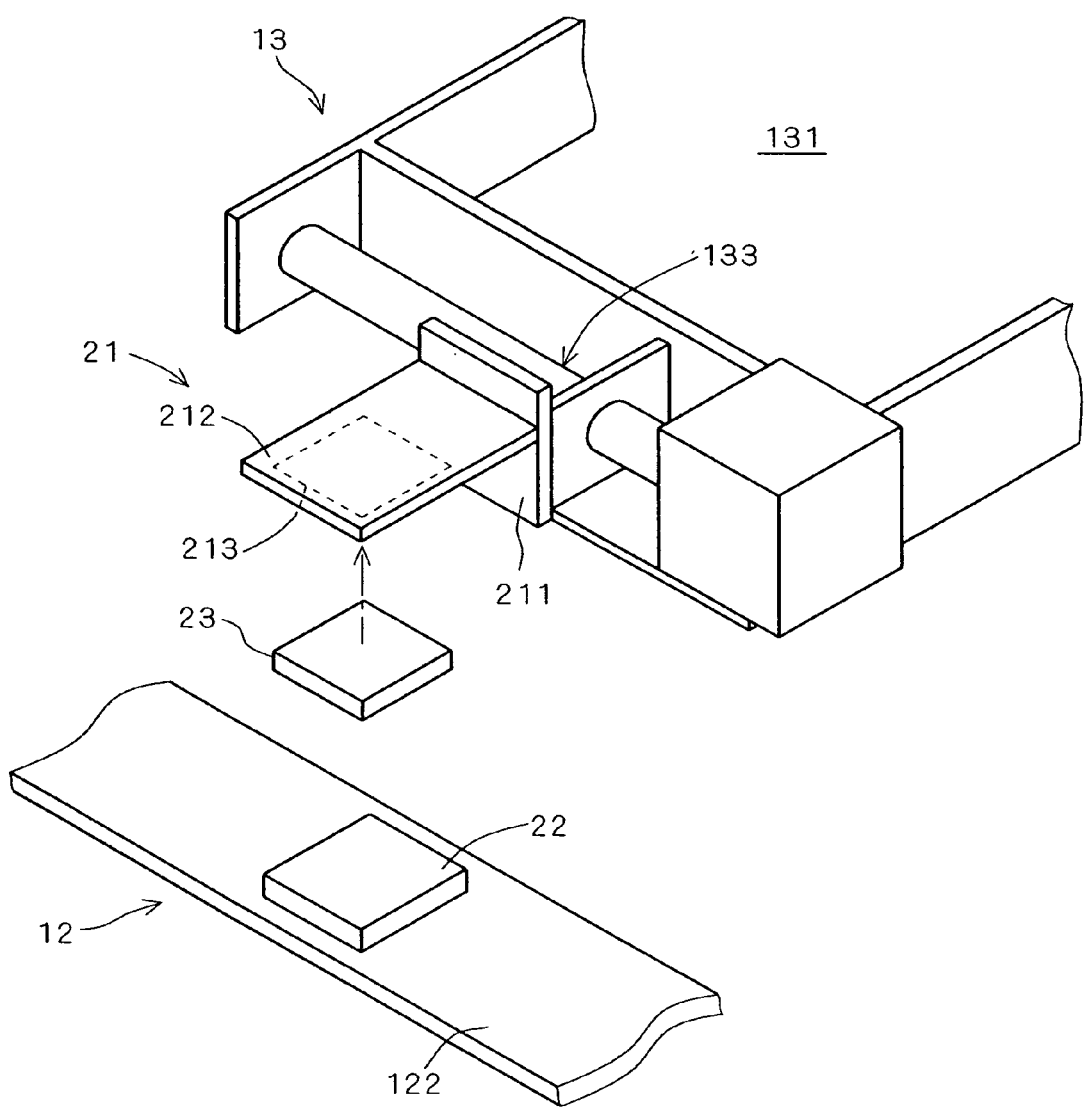
FIG. 18 is a magnified view of principal parts of a magnet support when viewed from the front.

FIG. 18 is a magnified view of the magnet support 21 which illustrates principal parts of the magnet support 21 when viewed from the front. As illustrated in FIG. 18, the magnet support 21 includes a plate-shaped magnet supporting arm 212 which extends outwardly from a wall 211 situated outwardly from the second actuator 133. The magnet supporting arm 212 includes a magnet receiver 213 at a lower face of an edge portion thereof. The magnet receiver 213 is configured such that a magnet 23 can be fit in and secured to the magnet receiver 213. The magnet 23 secured to the lower face of the magnet supporting arm 212 is situated so as to face the magnetic sensor unit 22 in the base plate 12 as illustrated in FIG. 18. Also, the magnet 23 and the magnetic sensor unit 22 are disposed such that a lower face of the magnet 23 and an upper face of the magnetic sensor unit 22 are substantially parallel to each other.

Referring back to FIG. 17, the first slider 14 includes an annular frame 142 which is made of aluminum and includes an opening 141 at a center thereof, as a base material. The second slider 13 is fit in the opening 141 of the annular frame 142. The first slider 14 further includes a first friction-engagement part 143, a second friction-engagement part 144, and a second spring hanger 145 which are provided in the annular frame 142. The first friction-engagement part 143 is situated so as to face the first actuator 123 of the base plate 12, and the second friction-engagement part 144 is situated so as to face the second actuator 133 of the second slider 13. Further, the second spring hanger 145 is situated so as to face the first spring hanger 124 of the base plate 12.

Figure 19:
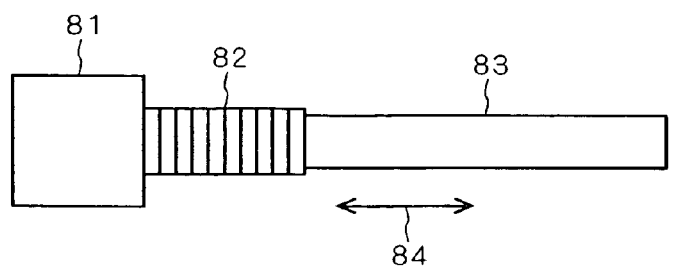
FIG. 19 illustrates a structure of an impact actuator.

Each of the first actuator 123 and the second actuator 133 includes a static part 81, a piezoelectric element 82 and a drive rod 83 as illustrated in FIG. 19. The static part 81 is secured to the base plate 12 or the second slider 13. The piezoelectric element 82 includes one end secured to the static part 81 and the other end connected to the drive rod 83. Those components of each of the first and second actuators 123 and 133 are configured such that the drive rod 83 moves a given distance in a given direction in accordance with drive pulses applied to the piezoelectric element 82. In this regard, the drive rod 83 moves along a length of each of the first and second actuators 123 and 133, that is, in directions indicated by a two-headed arrow 84 in an example illustrated in FIG. 19.

When the above-described camera-shake compensation apparatus 100 is assembled, the imaging device 16 is fit in the opening 131 of the second slider 13 to be secured to the second slider 13. Also, the drive rod 83 of the first actuator 123 is frictionally engaged with the first friction-engagement part 143, and the drive rod 83 of the second actuator 133 is frictionally engaged with the second friction-engagement part 144. Further, a spring 18 is stretched between the first spring hanger 124 and the second spring hanger 145, so that the base plate 12 and the first slider 14 are urged in respective directions which bring the base plate 12 and the first slider 14 close to each other. At that time, the second slider 13 is sandwiched between the base plate 12 and the first slider 14 with the hard spheres 19 interposed. Consequently, the base plate 12, the second slider 13 and the first slider 14 are arranged in a direction in which the Z axis extends (which is indicated by an arrow in FIG. 2 and will be hereinafter referred to as a "positive Z-axis direction") in the order of occurrence in this sentence, with the second slider 13 being overlaid on the base plate 12 and the first slider 14 being overlaid on the second slider 13.

In the camera-shake compensation apparatus 100 as assembled in the foregoing manner, movement of the drive rod 83 of the first actuator 123 is followed by movement of the first friction-engagement part 143 frictionally engaged with the drive rod 83 of the first actuator 123, which involves movement of the first slider 14 relative to the base plate 12 along the X axis. Further, also the second slider 13 moves relative to the base plate 12 along the X axis in unison with the first slider 14. On the other hand, movement of the drive rod 83 of the second actuator 133 is followed by movement of the second friction-engagement part 144 frictionally engaged with the drive rod 83 of the second actuator 133, which involves movement of the second slider 13 relative to the first slider 14 along the Y axis. At that time, the first slider 14 does not move relative to the base plate 12, and thus the second slider 13 alone moves relative to the base plate 12 along the Y axis.

As is made clear from the above description, each of the first slider 14 and the second slider 13 serves as a moving part which is capable of moving relative to the base plate 12 serving as a fixed part, while holding the imaging device 16, in the camera-shake compensation apparatus 100. The first slider 14 simply moves relative to the base plate 12 linearly along the X axis. In contrast thereto, the second slider 13 not only moves along the X axis in unison with the first slider 14, but also is capable of independently moving along the Y axis. The second slider 13 is configured to be capable of moving in the X-Y plane perpendicular to the optical axis while holding the imaging device 16.

It is noted that the respective drive rods 83 of the first actuator 123 and the second actuator 133 also function as guide parts for guiding the second slider 13 linearly along the X axis and the Y axis, respectively.

Figure 20:
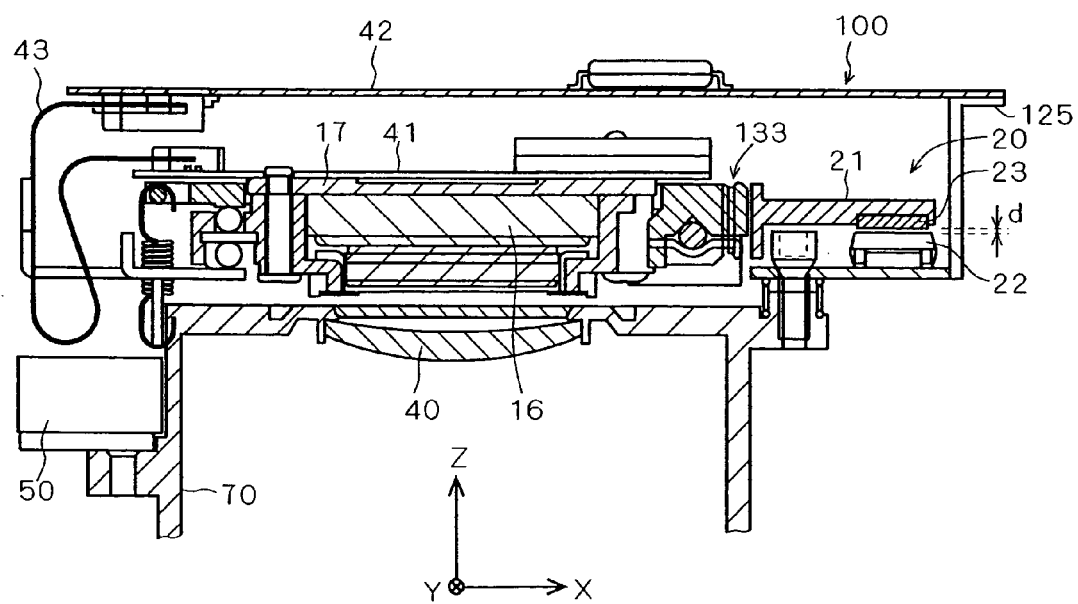
FIG. 20 is a sectional view taken along a line I-I in FIG. 17.

FIG. 20 is a sectional view taken along a line I-I in FIG. 17. FIG. 20 illustrates a state in which the camera-shake compensation apparatus 100 is assembled and attached to the lens barrel 70. In the camera-shake compensation apparatus 100, the magnetic sensor unit 22 provided in the base plate 12 and the magnet 23 attached to the second slider 13 are held to face each other in close proximity to each other. The magnetic sensor unit 22 is situated so as to be capable of satisfactorily detecting change in a magnetic field generated by the magnet 23. The second slider 13 is capable of moving in the X-Y plane as described above, and a position of the magnet 23 relative to the magnetic sensor unit 22 varies as the second slider 13 moves. Movement of the magnet 23 relative to the magnetic sensor unit 22 in the X-Y plane results in change of a magnetic field detected by the magnetic sensor unit 22. Hence, the magnetic sensor unit 22 detects a magnetic field which changes as the second slider 13 moves. Accordingly, it is possible to detect where the second slider 13 has moved or is moving (i.e., a current position of the second slider 12) via detection of change in a magnetic field generated by the magnet 23 which is performed by the magnetic sensor unit 22. Thus, the magnetic sensor unit 22 and the magnet 23 form a position detection mechanism 20 for detecting a position of the second slider 13 relative to the base plate 12. Since the magnet 23 does not require electric wiring, the position detection mechanism 20 employing the magnet 23 would produce advantages of significantly saving labors associated with installation of wiring.

Further, a first substrate 41 is provided on a back face (one of opposite faces which is situated in the positive Z-axis direction relative to the other face) of the imaging device 16 fit in the second slider 13, with a heat dissipation plate 17 being interposed therebetween. The imaging device 16 is connected to the first substrate 41. Accordingly, the first substrate 41 moves along the X axis and the Y axis in unison with the second slider 13. Also, the second substrate 42 is secured to the substrate supports 125 of the base plate 12. The first substrate 41 and the second substrate 42 are arranged along the optical axis (along the Z axis) while being overlaid upon each other. The first substrate 41 moves in parallel to the second substrate 42 as the second slider 13 moves. The first substrate 41 and the second substrate 42 are connected to each other by a flexible substrate 43, and configured to allow transmission and reception of a signal therebetween.

The magnetic sensor unit 22 is connected to the second substrate 42 by a signal line not illustrated. Also the gyro sensor 50 which detects shake of the image capture apparatus 300A and outputs a signal indicative of an angular rate (angular rate signal) of shake along the X axis and the Y axis is connected to the second substrate 42 by a signal line not illustrated.

The first substrate 41 is provided with an element or a circuit for controlling the imaging device 16. An output signal (image signal) of the imaging device 16 is supplied to the second substrate 42 via the flexible substrate 43. The second substrate 42 is provided with a circuit for processing the output signal of the imaging device 16, a circuit for processing a signal supplied from the magnetic sensor unit 22 which detects a position of the second slider 13, or the like. The second substrate 42 is further provided with a control circuit (a circuit including a microcomputer or the like) for controlling drive of the first and second actuators 123 and 133 based on a signal indicative of a position (values of coordinate X and Y) received from an output circuit and the angular rate signal received from the gyro sensor 50. Then, the second substrate 42 outputs the image signal captured in the imaging device 16 to a control circuit which is provided within the image capture apparatus 300A but not included in the camera-shake compensation apparatus 100, and sends a drive signal (drive pulses) to each of the first and second actuators 123 and 133 connected to the second substrate 42 by a signal line not illustrated.

In arranging circuits in the foregoing manner, the magnet 23 provided in the second slider 13 does not require electric wiring, so that a wiring pattern for each of the first substrate 41 and the second substrate 42 can be made relatively easy. This increases flexibility in arrangement of components or wire routing during a designing process, and improves an efficiency in assembling. In particular, since installation of wiring in a moving part results in creation of a resistance to movement of the moving part in some cases, it is desired to avoid installation of wiring in the moving part if possible. According to the third preferred embodiment, desirable arrangement is achieved, in which the magnet 23 is provided in the second slider 13 serving as a moving part so that the movement of the second slider 13 is not obstructed by wiring in the position detection mechanism 20.

Figure 21:
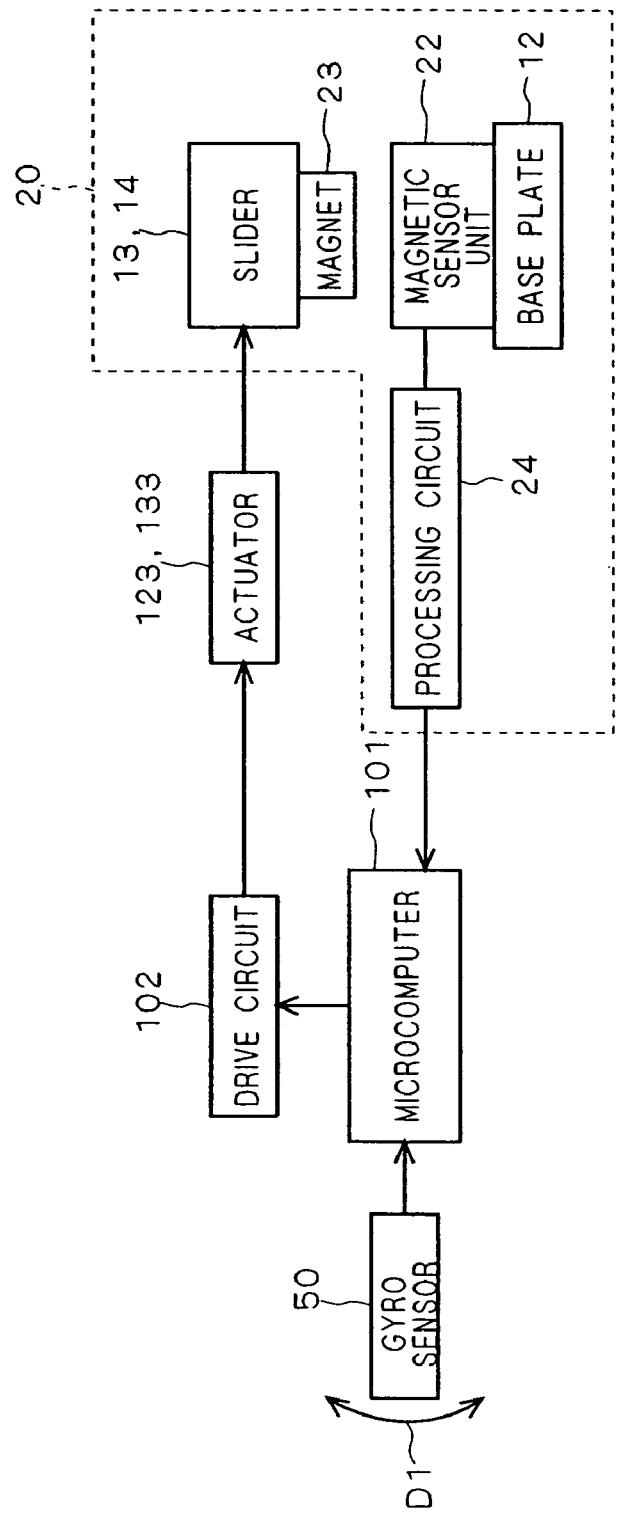
FIG. 21 is a block diagram showing electrical connection in a drive control circuit of the camera-shake compensation apparatus.

Next, operations of the above-described camera-shake compensation apparatus 100 will be described. FIG. 21 is a block diagram illustrating electrical connection in a drive control circuit of the camera-shake compensation apparatus 100 according to the third preferred embodiment. The drive control circuit includes: the gyro sensor 50 for detecting deviation of the optical axis L of light incident upon the lens barrel 70 and outputting an angular rate signal; a processing circuit 24 for processing a signal received from the magnetic sensor unit 22 which detects a position of the second slider 13 (or the imaging device 16); a microcomputer 101 for exercising comprehensive control for compensation for camera shake and calculating an amount to drive the sliders 13 and 14 based on various signals inputted to the microcomputer 101; and a drive circuit 102 for generating drive pulses at a predetermined frequency based on a drive signal supplied from the microcomputer 101. The drive pulses generated by the drive circuit 102 are outputted to the first and second actuators 123 and 133, upon application of which each of the first and second sliders 14 and 13 moves along the lengths of the first and second actuators.

The gyro sensor 50 detects an angular rate of movement along the two axes (along the X axis and the Y axis) and outputs a signal indicative of the detected angular rate (angular rate signal) to the microcomputer 101, in response to shake of the camera body 60 indicated by the arrow D1 in FIG. 18.

The microcomputer 101, upon receipt of the angular rate signal from the gyro sensor 5, calculates an amount and a speed of shift of an image on the imaging device 16 (in particular, on an image forming face) which occurs due to image blur, based on a signal indicative of a focal length of an optical system. Subsequently, the microcomputer 101 determines a supply voltage which should be applied to the first and second actuators 123 and 133 at a predetermined frequency, based on the calculated speed of shift and a current position of the second slider 13 (or the imaging device 16). To this end, the microcomputer 101 compares a position (current position) where the second slider 13 (or the imaging device 16) is actually being situated, with a position (target position) where the imaging device 16 is supposed to be situated under normal conditions. The current position of the second slider 13 (or the imaging device) is obtained based on a signal received from the magnetic sensor unit 22, and the target position is determined based on the angular rate signal received from the gyro sensor 5. Then, the microcomputer 101 exercises feedback control for driving the sliders 13 and 14 so that the imaging device 16 can move to the target position.

The drive circuit 102 receives the drive signal from the microcomputer 101, and outputs drive pulses at a frequency which is about seven-tenth a resonance frequency of the actuators 123 and 133. The drive pulses are applied to the piezoelectric element 82, to cause each of the first and second sliders 14 and 13 to move along the drive rod 83. More specifically, the drive pulses applied to the piezoelectric element 82 has a sawtooth waveform including a slow rise and a sharp fall. Then, application of the drive pulses to the piezoelectric element 82 can cause the part 13 (or 14) frictionally engaged with the drive rod 83 to move in a given direction by virtue of interaction between a friction force and an inertial force which depends on difference in magnitude therebetween. Conversely, application of drive pulses having another sawtooth waveform which includes a sharp rise and a slow fall, to the piezoelectric element 82, allows the part 13 (or 14) to move in a direction reverse to the given direction.

As is made clear from the foregoing, each of the first and second actuators 123 and 133 functions as an impact actuator, by which the slider 13 or 14 frictionally engaged with the drive rod 83 is caused to slide on the drive rod 83 as the piezoelectric element 82 gets longer or smaller. Application of the drive pulses to the first actuator 123 results in movement of the first slider 14 along the X axis, which is followed by the movement of the second slider 13 joined to the first slider 14 along the X axis. On the other hand, when the drive pulses are applied to the second actuator 133, the second slider 13 alone moves (free-running) along the Y axis, independently of the first slider 14. During the movement of the second slider 13 along the Y axis, the second slider 13 neither meets with a considerable resistance nor moves along the optical axis by virtue of the provision of the spring 18 stretched between the first slider 14 and the base plate 12 and the hard spheres 19 among the first and second sliders 14 and 13 and the base plate 12. Further, during the movement of the second slider 13 along the Y axis, a bent portion of the flexible substrate 43 connecting the first substrate 41 and the second substrate 42 is deformed to serve to absorb the movement of the second slider 13.

As described above, the camera-shake compensation apparatus 100 incorporates a position detection function supposed to be performed by a position detector. The position detection mechanism 20 includes the magnetic sensor unit 22 and the magnet 23, which constitutes one of structural features of the camera-shake compensation apparatus 100. According to the third preferred embodiment, the position detection mechanism 20 which eliminates the need of installation of wiring for position detection in at least one of a moving part and a fixed part is implemented.

In the meantime, the respective components of the position detection mechanism 20 described above structurally correspond to the respective components of the position detector 10C (illustrated in FIG. 15) according to the modification of the second preferred embodiment. More specifically, the magnet 23 structurally corresponds to the magnet 1, and the magnetic sensor unit 22 structurally corresponds to a sensor group formed of the four Hall effect devices 2a, 2b, 2c, and 2d of the position detector 10C. Further, the processing circuit 24 corresponds to a circuit including the two processing circuits and the A/D conversion circuit 4.

The processing circuit 24 carries out the same processing as carried out in the second preferred embodiment on each of output values of the two pairs of Hall effect devices (2a, 2b) and (2c, 2d), and subsequently converts an analog signal into a digital signal, to output the digital signal to the microcomputer 101.

Because of inclusion of the foregoing position detection mechanism (which may be referred to as a "position detector"), the image capture apparatus 300A can produce the same advantages as produced in the second preferred embodiment.

To employ the foregoing position detector would be advantageous especially when the foregoing position detector is employed in an image capture apparatus on which demands for size and cost reduction have been increasingly made. To employ the foregoing position detector would allow highly accurate drive control using highly accurate results of position measurement, as well as meet the above-mentioned demands. Also, since the foregoing position detector is of a non-contacting type that detects a position of an object without coming into contact with the object, a further advantage of preventing the foregoing position detector from being a noise source in the image capture apparatus can be produced.

Further, in the present example, the sensor array formed of the Hall effect devices 2a and 2b is situated to extend substantially along the direction of movement of the first actuator 123 (i.e., along the X axis), and the sensor array formed of the Hall effect devices 2c and 2d is situated to extend substantially along the direction of movement of the second actuator 133 (i.e., along the Y axis). Accordingly, a coordinate system used for identifying the coordinate values detected by the magnetic sensor unit 22 is substantially identical to a coordinate system used for controlling the first and second actuators 123 and 133. This eliminates the need of performing coordinate transformation in signal processing, to thereby carry out signal processing effectively.

Moreover, as a result of the arrangement of the four Hall effect devices as illustrated in FIG. 15, detection of change in both magnetic fields along the X axis and the Y axis can be achieved by simply providing the magnetic sensor unit 22 in the form of a single sensor package containing four Hall effect devices. Then, by simply providing the magnet 23 which faces the magnetic sensor unit 22, the position detection mechanism 20 capable of detecting positions on the X axis and the Y axis can be implemented. Hence, the arrangement of the Hall effect devices, 2a, 2b, 2c and 2d as illustrated in FIG. 15 is convenient for minimization of the size of the position detection mechanism 20.

Additionally, in the third preferred embodiment, a structure in which the magnetic sensor unit 22 includes four Hall effect devices so that change of a magnet field along each of the X axis and the Y axis can be detected with the use of a single magnetic sensor unit has been described, by way of example. Unlike this, a single magnetic sensor unit may be provided for detecting change of a magnetic field along each axis. For example, two magnetic sensors may be provided. One of the two magnetic sensors is situated outwardly from the first actuator 123 and functions to detect a position on the X axis, and the other magnetic sensor is situated outwardly from the second actuator 133 (corresponding to the position of the position detection mechanism 20 described above in the third preferred embodiment), and functions to detect a position on the Y axis.

Further, in the third preferred embodiment, a case in which an impact actuator employing the piezoelectric element 82 as a drive part is applied in order to move the first and second sliders 14 and 13 each of which is a moving part has been described, by way of example. However, the present invention is not limited to this example, and other drive system or method may be applied.

D. Fourth Preferred Embodiment

In a fourth preferred embodiment, another specific example of application of a position detector will be described. Below, an example in which one of the above-described position detectors is used for detection of a position of a lens in an image capture apparatus will be described.

Figure 22:
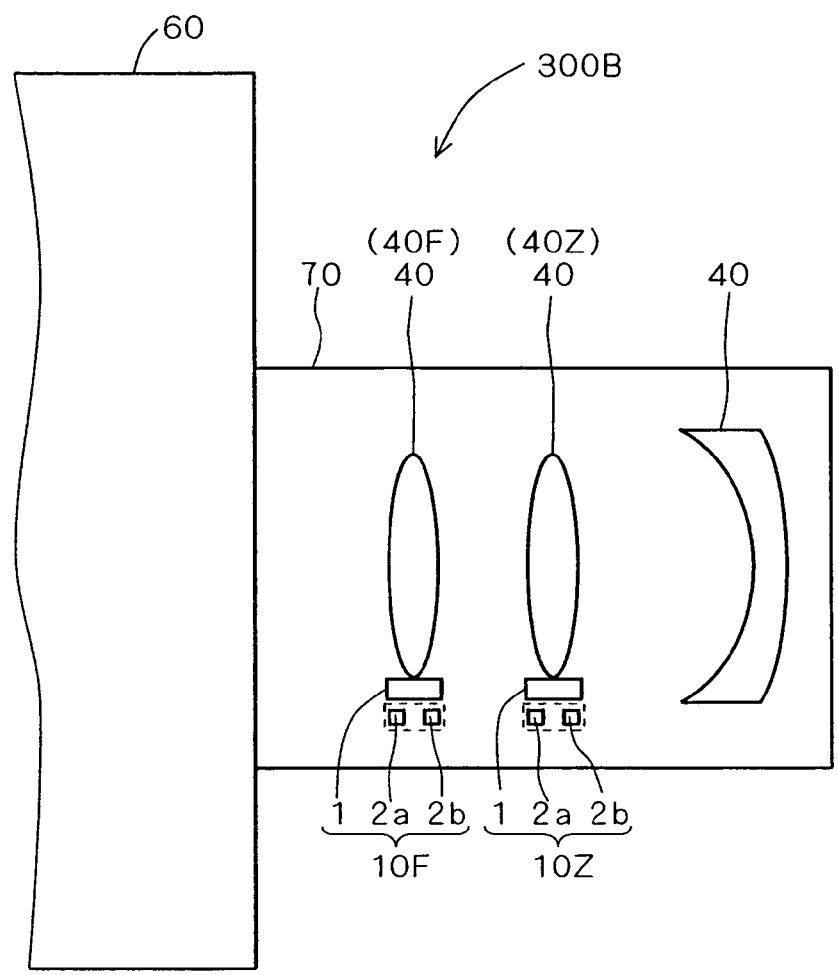
FIG. 22 illustrates another image capture apparatus incorporating a position detector.

FIG. 22 illustrates an image capture apparatus 300B (a digital still camera in the present example).

The image capture apparatus 300B includes the plurality of lenses 40, the camera body 60, the lens barrel 70, and the like. The image capture apparatus 300B has an autofocus function and a zoom function. To this end, the plurality of lenses 40 include a focusing lens 40F and a zoom lens 40Z. Each of the focusing lens 40F and the zoom lens 40Z is movable relative to the lens barrel 70 along an optical axis, independently of each other.

Also, the focusing lens 40F and the zoom lens 40Z are provided with position detectors 10F and 10Z for detecting positions of the lenses 40F and 40Z, respectively.

Each of the position detectors 10F and 10Z is structurally identical to the position detector 10A according to the first preferred embodiment. For example, the position detector 10F includes the magnet 1 and the Hall effect devices 2a and 2b. Likewise, the position detector 10Z includes the magnetic force generator (magnet) 1 and the Hall effect devices 2a and 2b. Further, the processing circuit 3 according to the first preferred embodiment and the like for processing an output of each of the pairs of Hall effect devices of the position detectors 10F and 10Z is included in the camera body 60, though such processing circuit is not illustrated in FIG. 22.

The magnet 1 of the position detector 10F is secured to a bottom of the focusing lens 40F which is a moving part, and the Hall effect devices 2a and 2b of the position detector 10F are secured to an inner face of the lens barrel 70 which is a fixed part. Hence, the position detector 10F is capable of detecting a position of the focusing lens 40F relative to the lens barrel 70 during focusing or the like. The position of the focusing lens 40F is detected by the position detector 10F, and the position of the focusing lens 40F can be controlled using the result of the detection. For example, it is possible to cause the focusing lens 40F to move toward a target position by exercising feedback control or the like.

Similarly, the magnet 1 of the position detector 10Z is secured to a bottom of the zoom lens 40Z which is a moving part, and the Hall effect devices 2a and 2b of the position detector 10Z are secured to the inner face of the lens barrel 70 which is a fixed part. Hence, the position detector 10Z is capable of detecting a position of the zoom lens 40Z relative to the lens barrel 70 during zooming or the like. The position of the zoom lens 40Z is detected by the position detector 10Z, and the position of the zoom lens 40Z can be controlled using the result of the detection. For example, it is possible to cause the zoom lens 40Z to move toward a target position by exercising feedback control or the like.

The image capture apparatus 300B can produce the same advantages as described in the first preferred embodiment. To employ the above-described position detectors would be advantageous especially when the above-described position detectors are employed in an image capture apparatus on which demands for size and cost reduction have been increasingly made. To employ the above-described position detectors would allow highly accurate drive control using highly accurate results of position measurement, as well as meet the above-mentioned demands. Also, since each of the above-described position detectors is of a non-contacting type that detects a position of an object without coming into contact with the object, a further advantage of preventing the above-described position detectors from being a noise source in the image capture apparatus and the like can be produced.

While the invention has been shown and described in detail, the foregoing description is in all aspects illustrative and not restrictive. It is therefore understood that numerous modifications and variations can be devised without departing from the scope of the invention.

What is claimed is:

1. A position detector comprising:
a magnetic-sensor pair including magnetic sensors spaced from each other;
a magnetic force generator; and
a controller for detecting relative positions of said magnetic force generator and said magnetic-sensor pair based on respective output values of said magnetic sensors, wherein a length of said magnetic force generator along a first axis along which a first space between said magnetic sensors extends is equal to or larger than a length of said first space along said first axis, wherein said controller detects a difference in magnitude between said output values of said magnetic sensors, as a position output, and said length of said magnetic force generator along said first axis is determined so that an evaluation value for evaluating linearity of a curve representing change in said difference which is responsive to positional change of said magnetic force generator meets a predetermined standard.

2. A position detector comprising:
a magnetic-sensor pair including magnetic sensors spaced from each other;
a magnetic force generator; and
a controller for detecting relative positions of said magnetic force generator and said magnetic-sensor pair based on respective output values of said magnetic sensors, wherein a length of said magnetic force generator along a first axis along which a first space between said magnetic sensors extends is equal to or larger than a length of said first space along said first axis, wherein said controller controls each of input values applied to said magnetic sensors such that a sum of magnitudes of said output values of said magnetic sensors is constant, and then detects a difference in magnitude between said output values of said magnetic sensors, as a position output, and said length of said magnetic force generator along said first axis is determined so that an evaluation value for evaluating linearity of a curve representing change in said difference which is responsive to positional change of said magnetic force generator meets a predetermined standard.

3. A position detector comprising:
a magnetic-sensor pair including magnetic sensors spaced from each other;
a magnetic force generator;
a controller for detecting relative positions of said magnetic force generator and said magnetic-sensor pair based on respective output values of said magnetic sensors, wherein a length of said magnetic force generator along a first axis along which a first space between said magnetic sensors extends is equal to or larger than a length of said first space along said first axis; and another magnetic-sensor pair including magnetic sensors spaced from each other along a second axis different from said first axis, wherein a length of said magnetic force generator along said second axis is equal to or larger than a length of a second space between said magnetic sensors included in said another magnetic-sensor pair along said second axis.

4. The position detector according to claim 3, wherein said length of said magnetic force generator along said second axis is equal to or larger than a sum of said length of said second space along said second axis and an allowable moving distance of said magnetic force generator along said second axis.

5. The position detector according to claim 4, wherein said length of said magnetic force generator along second axis is equal to or larger than a sum of said length of said second space along said second axis and said allowable moving distance of said magnetic force generator along said second axis, said allowable moving distance being set to be equal to or larger than said length of said second space along said second axis.

6. The position detector according to claim 3, wherein said first axis and said second axis are perpendicular to each other.

7. The position detector according to claim 6, wherein said magnetic sensors included in said magnetic-sensor pair and said another magnetic-sensor pair are arranged symmetrically with respect to a given point.

8. The position detector according to claim 7, wherein said magnetic force generator is cylindrical.

9. The position detector according to claim 3, wherein said magnetic force generator is prismatic.

* * * * *